US007924342B2

(12) United States Patent
Kusaka

(10) Patent No.: US 7,924,342 B2
(45) Date of Patent: Apr. 12, 2011

(54) IMAGE SENSOR WITH IMAGE-CAPTURING PIXELS AND FOCUS DETECTION PIXEL AREAS AND METHOD FOR MANUFACTURING IMAGE SENSOR

(75) Inventor: Yosuke Kusaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 546 days.

(21) Appl. No.: 12/000,515

(22) Filed: Dec. 13, 2007

(65) Prior Publication Data

US 2008/0143858 A1    Jun. 19, 2008

(30) Foreign Application Priority Data

Dec. 18, 2006   (JP) ................................ 2006-339856

(51) Int. Cl.
*H04N 5/232* (2006.01)
(52) U.S. Cl. .................... 348/345; 348/208.12; 348/326; 396/111; 396/114
(58) Field of Classification Search .................. 348/345, 348/208.12, 326; 396/111, 114
See application file for complete search history.

(56) References Cited

U.S. PATENT DOCUMENTS

| 6,574,437 | B2 * | 6/2003 | Sensui | 396/81 |
| 6,906,751 | B1 * | 6/2005 | Norita et al. | 348/349 |
| 7,283,737 | B2 * | 10/2007 | Ohmura | 396/111 |
| 2004/0169767 | A1 * | 9/2004 | Norita et al. | 348/350 |
| 2006/0045507 | A1 * | 3/2006 | Takamiya | 396/111 |
| 2007/0237511 | A1 * | 10/2007 | Kusaka | 396/111 |

FOREIGN PATENT DOCUMENTS

JP    A 01-216306    8/1989

* cited by examiner

*Primary Examiner* — Timothy J Henn
*Assistant Examiner* — Usman Khan
(74) *Attorney, Agent, or Firm* — Oliff & Berridge, PLC

(57) ABSTRACT

An image sensor equipped with imaging pixels disposed in a two-dimensional array, which converts an image formed through an optical system to an electrical signal, includes: first focus detection pixel groups each formed by disposing in the array of the imaging pixels a plurality of first pixels adopting a split pupil method; and second focus detection pixel groups each formed by disposing in the array of the imaging pixels a plurality of second pixels adopting a split pupil method different from the split pupil method adopted in the first pixels, and a relationship between a number of the first focus detection pixel groups and a number of the second focus detection pixel groups is determined in correspondence to directions of positions assumed by the first focus detection pixel groups and the second focus detection pixel groups relative to a center of the image sensor.

27 Claims, 33 Drawing Sheets

201: digital still camera
202: interchangeable lens
203: camera body
204: mount unit
206: lens drive control device
208: zooming lens
209: lens
210: focusing lens
211: aperture
212: image sensor
213: electrical contact point portion
214: body drive control device
215: liquid crystal display element drive circuit
216: liquid crystal display element
217: eyepiece lens
219: memory card 201: digital still camera
202: interchangeable lens
203: camera body
204: mount unit
206: lens drive control device
208: zooming lens
209: lens
210: focusing lens
211: aperture
212: image sensor
213: electrical contact point portion
214: body drive control device
215: liquid crystal display element drive circuit
216: liquid crystal display element
217: eyepiece lens
219: memory card

IMAGE SENSOR WITH IMAGE-CAPTURING PIXELS AND FOCUS DETECTION PIXEL AREAS AND METHOD FOR MANUFACTURING IMAGE SENSOR

INCORPORATION BY REFERENCE

The disclosures of the following applications are herein incorporated by reference:
Japanese Patent Application No. 2006-339856 filed Dec. 18, 2006
U.S. patent application Ser. No. 11/702,605 filed Feb. 6, 2007
U.S. patent application Ser. No. 11/704,198 filed Feb. 9, 2007
U.S. patent application Ser. No. 11/704,200 filed Feb. 9, 2007

BACKGROUND OF THE INVENTION

1. Field of the Invention

The present invention relates to an image sensor, a focus detection device and an imaging device.

2. Description of Related Art

There is an image sensor known in the related art that includes focus detection pixels, which are used to detect the focusing state by adopting the split pupil phase difference detection method, disposed along the horizontal direction over a central area of the image sensor and imaging pixels disposed around the focus detection pixels (see Japanese Laid Open Patent Publication No. H01-216306).

SUMMARY OF THE INVENTION

The focus detection function of the image sensor in the related art described above, with the focus detection pixels arrayed along the horizontal direction only over the central area of the image sensor, is limited since the focus detection target subject needs to be captured over the center of the image plane. If focus detection pixels are distributed over the entire range of the image plane in order to address this problem, the quality of the image obtained by interpolating the image output at each focus detection pixel position based upon the outputs from the surrounding imaging pixels is bound to become lower. Accordingly, it is crucial to strike an optimal balance in satisfying the requirements pertaining to the imaging function and the requirements pertaining to the focus detection function so as to improve the focus detection performance while assuring satisfactory image quality.

According to the 1st aspect of the present invention, an image sensor equipped with imaging pixels disposed in a two-dimensional array, which converts an image formed through an optical system to an electrical signal, comprises: first focus detection pixel groups each formed by disposing in the array of the imaging pixels a plurality of first pixels adopting a split pupil method; and second focus detection pixel groups each formed by disposing in the array of the imaging pixels a plurality of second pixels adopting a split pupil method different from the split pupil method adopted in the first pixels, and a relationship between a number of the first focus detection pixel groups and a number of the second focus detection pixel groups is determined in correspondence to directions of positions assumed by the first focus detection pixel groups and the second focus detection pixel groups relative to a center of the image sensor.

According to the 2nd aspect of the present invention, in the image sensor according to the 1st aspect, it is preferred that when the image sensor is divided into a first region ranging along a first direction in which the first pixels in each of the first focus detection pixel groups are disposed and a second region ranging along a second direction in which the second pixels in each of the second focus detection pixel groups are disposed, the second focus detection pixel groups are disposed in a greater number than the first focus detection pixel groups in the first region and the first focus detection pixel groups are disposed in a greater number than the second focus detection pixel groups in the second region.

According to the 3rd aspect of the present invention, in the image sensor according to theist aspect, it is preferred that the relationship between the number of the first focus detection pixel groups and the number of the second focus detection pixel groups is determined in correspondence to a distance from the center of the image sensor.

According to the 4th aspect of the present invention, in the image sensor according to the 1st aspect, it is preferred that: the first pixels and the second pixels are disposed respectively along a first direction and a second direction in which pixels are disposed densely in the array of the imaging pixels; and when the image sensor is divided into a first region ranging along the first direction and a second region ranging along the second direction with borderlines extending along radial directions different from the first direction and the second direction in reference to a position through which an optical axis of the optical system passes, the second focus detection pixel groups are disposed in a greater number than the first focus detection pixel groups in the first region and the first focus detection pixel groups are disposed in a greater number than the second focus detection pixel groups in the second region.

According to the 5th aspect of the present invention, in the image sensor according to the 4th aspect, it is preferred that the borderlines extend at 45° inclinations relative to the first direction and the second direction.

According to the 6th aspect of the present invention, in the image sensor according to the 1st aspect, it is preferred that photoelectric conversion units at the first pixels in the first focus detection pixel groups assume a size different from the size of photoelectric conversion units at the second pixels in the second focus detection pixel groups.

According to the 7th aspect of the present invention, in the image sensor according to the 2nd aspect, it is preferred that photoelectric conversion units at the first pixels in the first focus detection pixel groups disposed in the first region are smaller in size than photoelectric conversion units at the second pixels in the second focus detection pixel groups disposed in the first region.

According to the 8th aspect of the present invention, in the image sensor according to the 1st aspect, it is preferred that the first pixels in the first focus detection pixel groups and the second pixels in the second focus detection pixel groups each include a single photoelectric conversion unit, photoelectric conversion units at first pixels adjacent to each other are paired up and photoelectric conversion units at second pixels adjacent to each other are paired up.

According to the 9th aspect of the present invention, in the image sensor according to the 1st aspect, it is preferred that: the first pixels each include a photoelectric conversion unit that receives a light flux having passed through at least one of a pair of areas set side by side along a first direction on an exit pupil of the optical system and the first focus detection pixel groups are each formed by disposing a plurality of the first pixels along a direction corresponding to the first direction; the second pixels each include a photoelectric conversion unit that receives a light flux having passed through at least one of a pair of areas set side by side along a second direction different from the first direction on the exit pupil of the optical system and the second focus detection pixel groups are each formed by disposing a plurality of the second pixels along a direction corresponding to the second direction; and when the image sensor is divided into a first region ranging along a direction corresponding to the first direction and a second region ranging along a direction corresponding to the second direction with borderlines extending along radial directions different from the first direction and the second direction in reference to a position through which an optical axis of the optical system passes, the second focus detection pixel groups are disposed in a greater number than the first focus detection pixel groups in the first region and the first focus detection pixel groups are disposed in a greater number than the second focus detection pixel groups in the second region.

According to the 10th aspect of the present invention, in the image sensor according to any one of the 4th through 9th aspects, it is preferred that a ratio of the number of the first focus detection pixel groups to the number of the second focus detection pixel groups is gradually reduced further away from the position at which the optical axis passes in the first region and a ratio of the number of the second focus detection pixel groups to the number of the first focus detection pixel groups is gradually reduced further away from the position at which the optical axis passes in the second region.

According to the 11th aspect of the present invention, in the image sensor according to any one of the 1st through 10th aspects, it is preferred that at the center of the pixel array in the image sensor, a first focus detection pixel group and a second focus detection pixel group are disposed so as to intersect each other.

According to the 12th aspect of the present invention, in the image sensor according to any one of the 2nd through 9th aspects, it is preferred that only the second focus detection pixel groups are disposed in the first region over a peripheral area of the pixel array in the image sensor and only the first focus detection pixel groups are disposed in the second region over a peripheral area of the pixel array in the image sensor.

According to the 13th aspect of the present invention, in the image sensor according to any one of the 2nd, 3rd and 5th through 9th aspects, it is preferred that the first direction and the second direction are directions along which pixels are densely disposed in the pixel array in the image sensor.

According to the 14th aspect of the present invention, a focus detection device, comprises: an image sensor according to any one of the 1st through 13th aspects; and a focus detection unit that detects a state of focus adjustment at the optical system based upon outputs from the first focus detection pixel groups and the second focus detection pixel groups.

According to the 15th aspect of the present invention, an the imaging device comprises: an image sensor according to any one of the 1st through 13th aspects; an interpolation unit that interpolates image outputs at positions assumed by the first pixels and the second pixels based upon outputs from the imaging pixels surrounding the first pixels and the second pixels; and a control unit that generates an image signal based upon the image outputs obtained through interpolation executed by the interpolation unit at the positions assumed by the first pixels and the second pixels, and the outputs from the imaging pixels.

According to the 16th aspect of the present invention, an the image sensor equipped with imaging pixels disposed in a two-dimensional array, which converts an image formed through an optical system to an electrical signal, comprises: first focus detection pixel groups each formed by disposing in the array of the imaging pixels a plurality of first pixels adopting a split pupil method; and second focus detection pixel groups each formed by disposing in the array of the imaging pixels a plurality of second pixels adopting a split pupil method different from the split pupil method adopted in the first pixels, and a relationship between a number of the first focus detection pixel groups and a number of the second focus detection pixel groups is determined in correspondence to distances of positions assumed by the first focus detection pixel groups and the second focus detection pixel groups from a center of the image sensor.

According to the 17th aspect of the present invention, a method for manufacturing an image sensor comprises: disposing imaging pixels in a two-dimensional array that convert an image formed through an optical system to an electrical signal; forming first focus detection pixel groups each by disposing in the array of the imaging pixels a plurality of first pixels adopting a split pupil method; and forming second focus detection pixel groups each by disposing in the array of the imaging pixels a plurality of second pixels adopting a split pupil method different from the split pupil method adopted in the first pixels, and a relationship between a number of the first focus detection pixel groups and a number of the second focus detection pixel groups is determined in correspondence to directions of positions assumed by the first focus detection pixel groups and the second focus detection pixel groups relative to a center of the image sensor.

According to the 18th aspect of the present invention, in the method for manufacturing an image sensor according to the 17th aspect, it is preferred that when the image sensor is divided into a first region ranging along a first direction in which the first pixels in each of the first focus detection pixel groups are disposed and a second region ranging along a second direction in which the second pixels in each of the second focus detection pixel groups are disposed, the second focus detection pixel groups are disposed in a greater number than the first focus detection pixel groups in the first region and the first focus detection pixel groups are disposed in a greater number than the second focus detection pixel groups in the second region.

According to the 19th aspect of the present invention, in the method for manufacturing an image sensor according to the 17th aspect, it is preferred that the relationship between the number of the first focus detection pixel groups and the number of the second focus detection pixel groups is determined in correspondence to a distance from the center of the image sensor.

According to the 20th aspect of the present invention, in the method for manufacturing an image sensor according to the 17th aspect, it is preferred that: the first pixels and the second pixels are disposed respectively along a first direction and a second direction in which pixels are disposed densely in the array of the imaging pixels; and when the image sensor is divided into a first region ranging along the first direction and a second region ranging along the second direction with borderlines extending along radial directions different from the first direction and the second direction in reference to a position through which an optical axis of the optical system passes, the second focus detection pixel groups are disposed in a greater number than the first focus detection pixel groups in the first region and the first focus detection pixel groups are disposed in a greater number than the second focus detection pixel groups in the second region.

According to the 21st aspect of the present invention, in the method for manufacturing an image sensor according to the 17th aspect, it is preferred that photoelectric conversion units at the first pixels in the first focus detection pixel groups assume a size different from the size of photoelectric conversion units at the second pixels in the second focus detection pixel groups.

According to the 22nd aspect of the present invention, in the method for manufacturing an image sensor according to the 18th aspect, it is preferred that photoelectric conversion units at the first pixels in the first focus detection pixel groups disposed in the first region are smaller in size than photoelectric conversion units at the second pixels in the second focus detection pixel groups disposed in the first region.

According to the 23rd aspect of the present invention, in the method for manufacturing an image sensor according to the 17th aspect, it is preferred that: the first pixels each include a photoelectric conversion unit that receives a light flux having passed through at least one of a pair of areas set side by side along a first direction on an exit pupil of the optical system and the first focus detection pixel groups are each formed by disposing a plurality of the first pixels along a direction corresponding to the first direction; the second pixels each include a photoelectric conversion unit that receives a light flux having passed through at least one of a pair of areas set side by side along a second direction different from the first direction on the exit pupil of the optical system and the second focus detection pixel groups are each formed by disposing a plurality of the second pixels along a direction corresponding to the second direction; and when the image sensor is divided into a first region ranging along a direction corresponding to the first direction and a second region ranging along a direction corresponding to the second direction with borderlines extending along radial directions different from the first direction and the second direction in reference to a position through which an optical axis of the optical system passes, the second focus detection pixel groups are disposed in a greater number than the first focus detection pixel groups in the first region and the first focus detection pixel groups are disposed in a greater number than the second focus detection pixel groups in the second region.

According to the 24th aspect of the present invention, in the method for manufacturing an image sensor according to any one of the 20th through 23rd aspects, it is preferred that a ratio of the number of the first focus detection pixel groups to the number of the second focus detection pixel groups is gradually reduced further away from the position at which the optical axis passes in the first region and a ratio of the number of the second focus detection pixel groups to the number of the first focus detection pixel groups is gradually reduced further away from the position at which the optical axis passes in the second region.

According to the 25th aspect of the present invention, a method for manufacturing an image sensor comprises: disposing imaging pixels in a two-dimensional array that convert an image formed through an optical system to an electrical signal; forming first focus detection pixel groups each by disposing in the array of the imaging pixels a plurality of first pixels adopting a split pupil method; and forming second focus detection pixel groups each by disposing in the array of the imaging pixels a plurality of second pixels adopting a split pupil method different from the split pupil method adopted in the first pixels, and a relationship between a number of the first focus detection pixel groups and a number of the second focus detection pixel groups is determined in correspondence to distances of positions assumed by the first focus detection pixel groups and the second focus detection pixel groups from a center of the image sensor.

DESCRIPTION OF PREFERRED EMBODIMENTS

Figure 1:
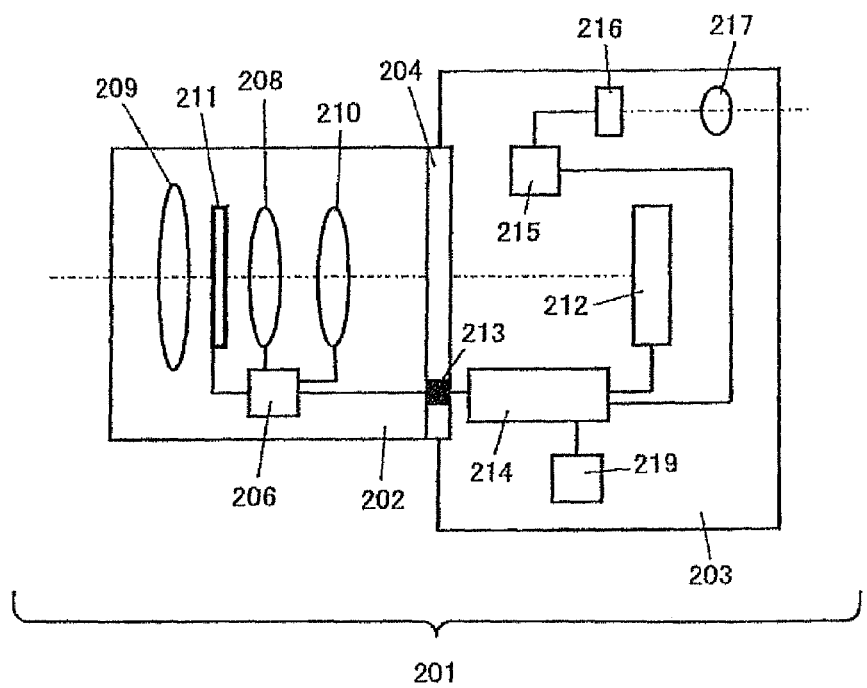
FIG. 1 shows the structure adopted in an embodiment.

A digital still camera achieved in an embodiment by adopting the image sensor, the focus detection device and the imaging device (the image-capturing device) according to the present invention is now explained. FIG. 1 shows the structure adopted in the embodiment. A digital still camera 201 achieved in the embodiment comprises an interchangeable lens 202 and a camera body 203. The interchangeable lens 202 is mounted at the camera body 203 via a mount unit 204.

The interchangeable lens 202 includes a lens drive control device 206, a zooming lens 208, a lens 209, a focusing lens 210, an aperture 211 and the like. The lens drive control device 206, which includes a microcomputer and peripheral components such as a memory, controls the drive of the focusing lens 210 and the aperture 211, detects the states of the aperture 211, the zooming lens 208 and the focusing lens 210, transmits lens information to a body dive control device 214 to be detailed later, receives camera information from the body drive control device 214 and the like.

An image sensor 212, the body drive control device 214, a liquid crystal display element drive circuit 215, a liquid crystal display element 216, an eyepiece lens 217, a memory card 219 and the like are disposed at the camera body 203. Pixels to be detailed later are two-dimensionally arrayed at the image sensor 212, which is disposed at an predetermined imaging plane of the interchangeable lens 202 to capture a subject image formed through the interchangeable lens 202. It is to be noted that focus detection pixels arrayed at specific focus detection positions at the image sensor 212, are to be described in detail later.

The body drive control device 214, constituted with a microcomputer and peripheral components such as a memory, controls image signal read from the image sensor 212, image signal correction, detection of the focus adjustment state at the interchangeable lens 202 and reception/transmission of lens information/camera information (defocus amount) from/to the lens drive control device 206, as well as the overall operation of the digital still camera. The body drive control device 214 and the lens drive control device 206 engage in communication with each other via an electrical contact point portion 213 at the mount unit 204 to exchange various types of information.

The image sensor 212 equipped with the focus detection pixels and the body drive control device 214 described above constitute a focus detection device. In addition, the digital still camera 201 or, more specifically, the camera body 203 constitutes an imaging device.

The liquid crystal display element drive circuit 215 drives the liquid crystal display element 216 at an electronic viewfinder (EVF: electrical viewfinder). The photographer is able to observe an image displayed at the liquid crystal display element 216 via the eyepiece lens 217. The memory card 219 can be loaded into/unloaded from the camera body 203 freely and is a portable storage medium for storing image data.

A subject image on the image sensor 212 with light having passed through the interchangeable lens 202 undergoes photoelectric conversion at the image sensor 212 and the photoelectric conversion output is then provided to the body drive control device 214. The body drive control device 214 calculates the defocus amount indicating the extent of defocusing manifesting at a specific focus detection position based upon the data output from the focus detection pixels disposed on the image sensor 212 and transmits this defocus amount to the lens drive control device 206. In addition, the body drive control device 214 stores image signals generated based upon the output from the image sensor 212 into the memory card 219 and provides the image signals to the liquid crystal display element drive circuit 215 to enable the liquid crystal display element 216 to display the image.

Operation members (e.g., a shutter button, a focus detection position setting member and the like, not shown) are disposed at the camera body 203. The body drive control device 214 detects operation state signals from these operation members and controls operations (imaging operation, focus detection position setting operation, image processing operation) based upon the detection results.

The lens drive control device 206 adjusts the lens information in correspondence to the current focusing state, zooming state and aperture setting state, the aperture F value and the like. More specifically, the lens drive control device 206 monitors the positions of the lenses 208 and 210 and the aperture setting at the aperture 211, and calculates correct lens information based upon the monitored information. Alternatively, it may select the lens information corresponding to the monitored information from a lookup table prepared in advance. In addition, the lens drive control device 206 calculates a lens drive quantity indicating the extent to which the lens is to be driven based upon the defocus amount having been received and drives the focusing lens 210 to a focus match point based upon the lens drive quantity via a drive source such as motor (not shown).

The requirements that the image sensor should fulfill with regard to its imaging function and with regard to its focus detection function are now summarized. In relation to the imaging function, the image sensor must interpolate the image output at a focus detection pixel position based upon image outputs from the surrounding imaging pixels and since the image quality is lowered through the interpolation, the ratio of the number of focus detection pixels to the overall number of pixels constituting the image sensor must be set as small as possible. In addition, if line images overlap at an image sensor with focus detection pixels disposed in succession over a significant length, the extent of the interpolation error will tend to increase, resulting in degradation of the image quality. Accordingly, the focus detection pixel arrangement length should be minimized. These requirements must be satisfied in the image sensor by restricting the number of focus detection pixels.

The focus detection function-related requirements include the need for as many focus detection areas as possible to be set in the image plane to ensure that the focus detection target image is captured with a high level of reliability no matter where it is present within the image plane. In addition, in order to enable focus detection even when the contrast of the focus detection target image changes only along a specific direction, the focus detection should be executed along as many directions as possible, which necessitates that focus detection pixels be arrayed along multiple directions. At the same time, since the pixels at the image sensor are two-dimensionally arrayed along directions extending perpendicular to each other (in a matrix), the pixels are arrayed with the smallest pitch along the two perpendicular directions (horizontally and vertically) and higher focus detection accuracy is achieved when focus detection pixel pitch is smaller, focus detection pixels must be arranged on the image plane at least along the direction of rows and along the direction of columns. The requirements described above are fulfilled by increasing the number of focus detection pixels.

Accordingly, the embodiment provides an efficient image sensor assuring superior focus detection performance with a limited number of focus detection pixels by striking an optimal balance between imaging function-related requirements and focus detection function-related requirements.

Figure 2:
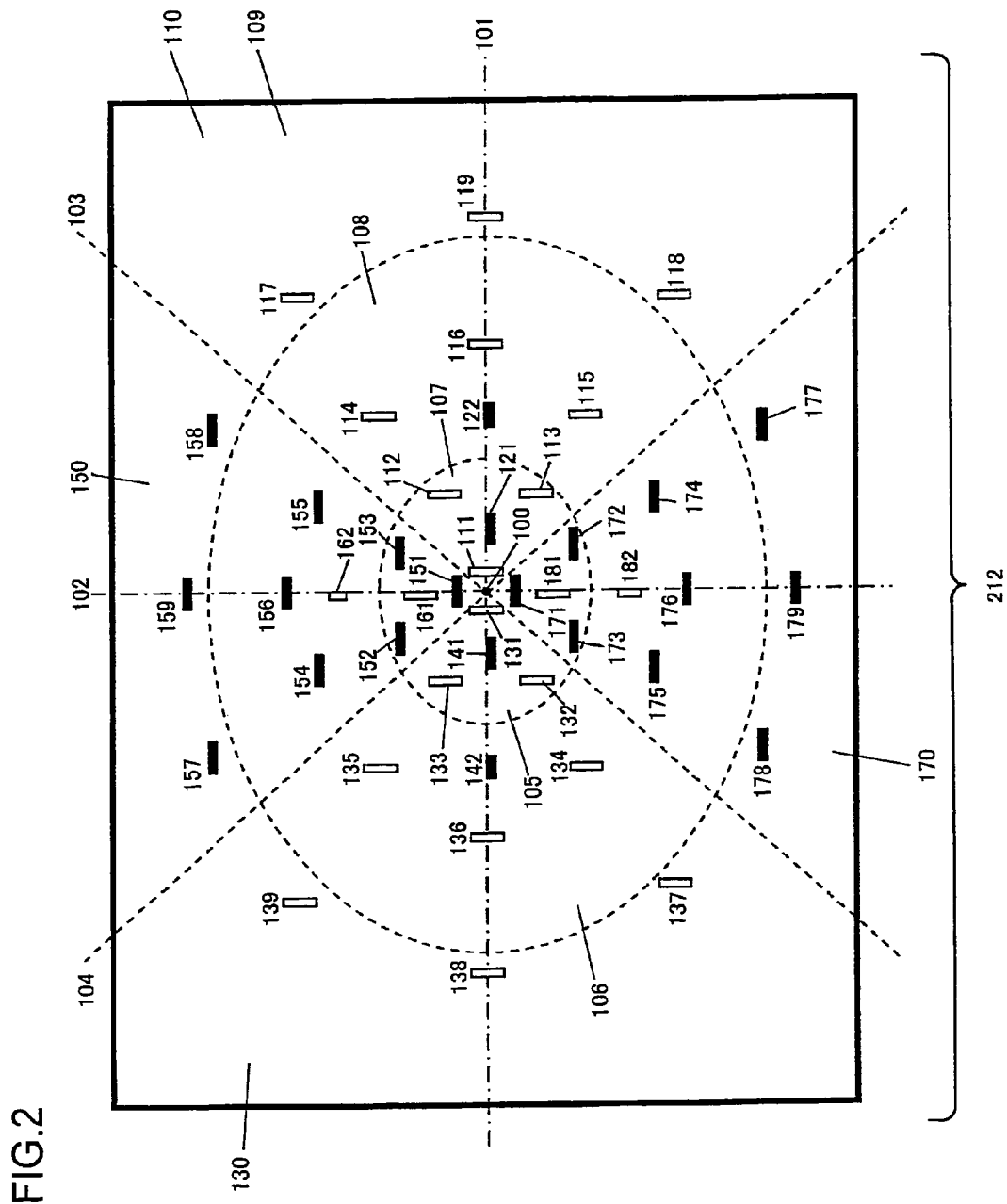
FIG. 2 is a plan view of the image sensor.

FIG. 2 is a plan view of the image sensor 212. The image sensor 212 includes imaging pixels arrayed in a two-dimensional square matrix pattern along a horizontal direction and a vertical direction perpendicular to the horizontal direction and focus detection pixels. Namely, the imaging pixels are densely arrayed along the horizontal direction and the vertical direction, i.e., the dense pixel array ranges along the horizontal direction and the vertical direction. In FIG. 2, a point 100 indicates the center of the photographic image plane at the image sensor 212, i.e., intersecting point at which the optical axis of the interchangeable lens 202 intersects the photographic image plane of the full image sensor 212, a straight line 101 extends along the horizontal direction by passing through the image plane center 100 and a straight line 102 extends along the vertical direction by passing through the image plane center 100. In addition, a straight line 103 is drawn by rotating the straight line 101 by 45° along the counterclockwise direction around the image plane center 100, whereas a straight line 104 is drawn by rotating the straight line 102 by 45° along the counterclockwise direction around the image plane center 100.

The photographic image plane at the image sensor 212 is divided into four regions partitioned from one another by the straight lines 103 and 104 extending along the radial direction from the image plane center 100. While regions 110 and 130 range respectively to the right and to the left along the horizontal direction (along the left-right direction in the figure) relative to the point 100, regions 150 and 170 range respectively upward and downward along the vertical direction (along the top-bottom direction in the figure) relative to the image plane center 100. In addition, ellipses 105 and 106 indicated by the dotted lines in FIG. 2 are centered at the image plane center 100. An area 107 near the image plane center ranges over the inside of the ellipse 105 and contains the image plane center 100, a middle area 108 is set outside the ellipse 105 and also on the inside of the ellipse 106, and an image-plane peripheral area 109 ranges over the outside of the ellipse 106.

It is to be noted that circles centered at the image plane center 100 or quadrangles centered at the image plane center 100, instead of the ellipses 105 and 106, may be set.

FIG. 2 shows focus detection pixels arrayed over areas indicated by the small rectangles. These rectangular areas constitute focus detection areas. The direction along which the longer side of the rectangle extends indicates the direction in which focus detection pixels are disposed in each area and unfilled rectangles each indicate an area in which focus detection pixels are arrayed in the vertical direction, whereas filled rectangle each indicates an area over which focus detection pixels are arrayed along the horizontal direction. The length of the longer side of each rectangle indicates the length of the corresponding focus detection area (the number of focus detection pixels disposed in the particular arrangement), and a smaller length is set for areas 122, 142, 162 and 182 compared to the length of the other rectangular areas. Imaging pixels are arrayed in the area that is not taken up by the focus detection areas and in the area not occupied by the plurality of focus detection areas, only imaging pixels are present.

In the region 110 set to the right relative to the image plane center 100 along the horizontal direction, focus detection areas 111, 112 and 113 each constituted with focus detection pixels disposed along the vertical direction and a focus detection area 121 constituted with focus detection pixels disposed along the horizontal direction are present in the image plane center area 107. In addition, focus detection areas 114, 115 and 116 each constituted with focus detection pixels disposed along the vertical direction and a focus detection area 122 constituted with focus detection pixels disposed along the horizontal direction are present in the middle area 108 within the region 110. Focus detection areas 117, 118 and 119 each constituted with focus detection pixels disposed along the vertical direction are present but no focus detection area with focus detection pixels disposed along the horizontal direction is present in the peripheral area 109 within the region 110.

In the region 130 set to the left relative to the image plane center 100 along the horizontal direction, focus detection areas 131, 132 and 133 each constituted with focus detection pixels disposed along the vertical direction and a focus detection area 141 constituted with focus detection pixels disposed along the horizontal direction are present in the image plane center area 107. In addition, focus detection areas 134, 135 and 136 each constituted with focus detection pixels disposed along the vertical direction and a focus detection area 142 constituted with focus detection pixels disposed along the horizontal direction are present in the middle area 108 within the region 130. Focus detection areas 137, 138 and 139 each constituted with focus detection pixels disposed along the vertical direction are present but and no focus detection area with focus detection pixels disposed along the horizontal direction is present in the image plane peripheral area 109 within the region 130.

In the region 150 set on the upper side relative to the image plane center 100 along the vertical direction, focus detection areas 151, 152 and 153 each constituted with focus detection pixels disposed along the horizontal direction and a focus detection area 161 constituted with focus detection pixels disposed along the vertical direction are present in the image plane center area 107. In addition, focus detection areas 154, 155 and 156 each constituted with focus detection pixels disposed along the horizontal direction and a focus detection area 162 constituted with focus detection pixels disposed along the vertical direction are present in the middle area 108 within the region 150. Focus detection areas 157, 158 and 159 each constituted with focus detection pixels disposed along the horizontal direction are present but no focus detection area with focus detection pixels disposed along the vertical direction is present in the peripheral area 109 within the region 150.

In the region 170 set on the lower side relative to the image plane center 100 along the vertical direction, focus detection areas 171, 172 and 173 each constituted with focus detection pixels disposed along the horizontal direction and a focus detection area 181 constituted with focus detection pixels disposed along the vertical direction are present in the image plane center area 107. In addition, focus detection areas 174, 175 and 176 each constituted with focus detection pixels disposed along the horizontal direction and a focus detection area 182 constituted with focus detection pixels disposed along the vertical direction are set in the middle area 108 within the region 170. Focus detection areas 177, 178 and 179 each constituted with focus detection pixels disposed along the horizontal direction are present but no focus detection area with focus detection pixels disposed along the vertical direction is present in the peripheral area 109 within the region 170.

Figure 3:
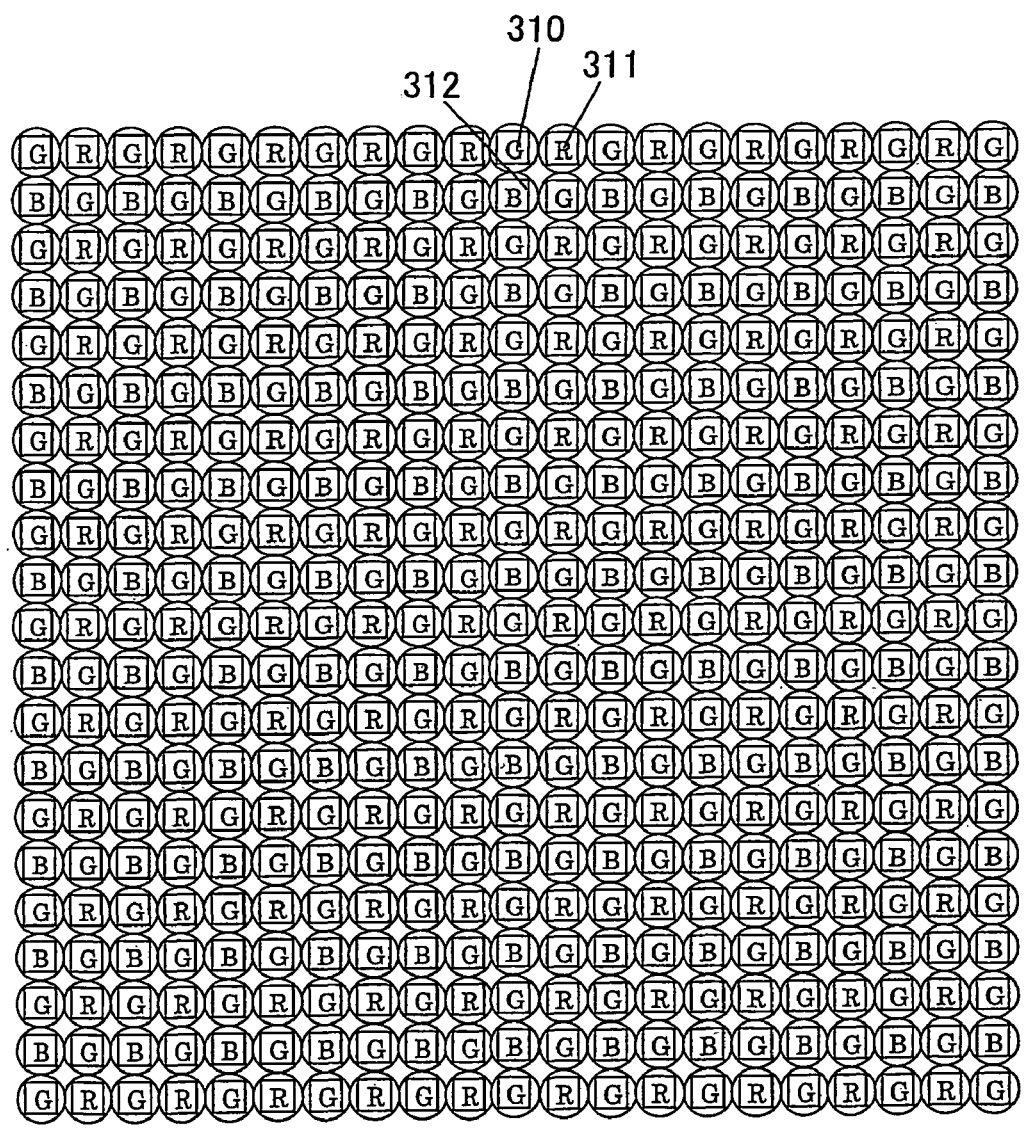
FIG. 3 is an enlarged view of the imaging pixel array at the image sensor in FIG. 2.
Figure 6:
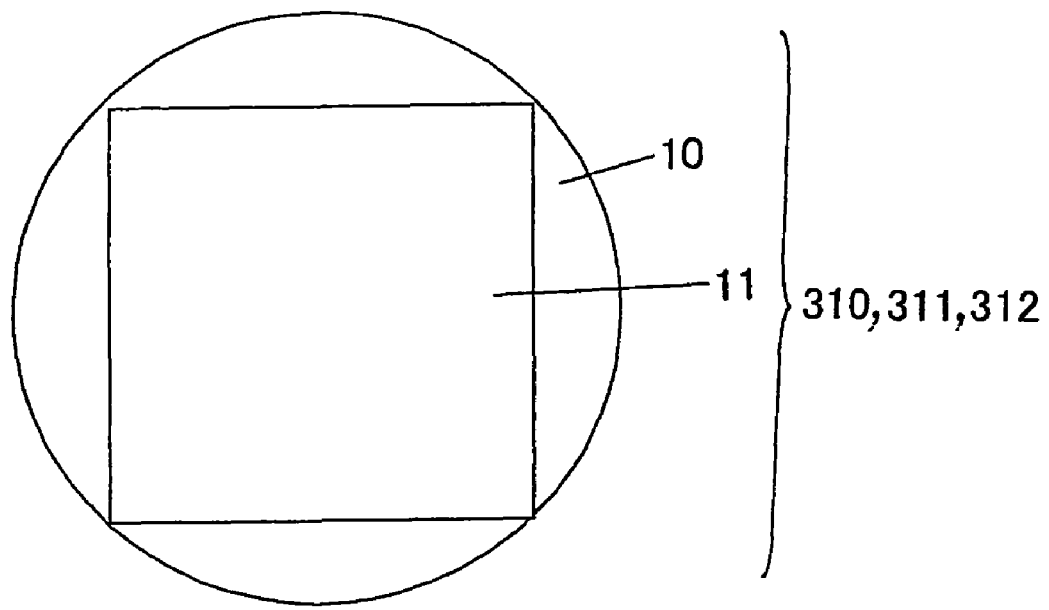
FIG. 6 shows the structure of the imaging pixels.
Figure 9:
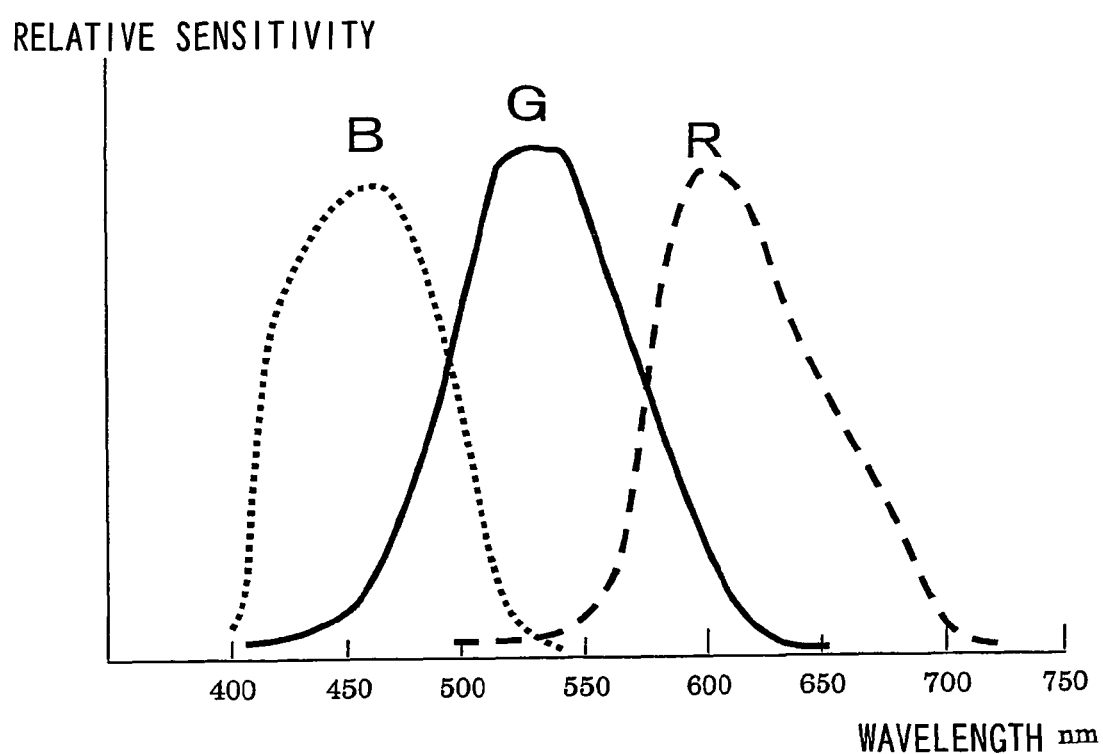
FIG. 9 shows the spectral characteristics of the imaging pixels.

FIG. 3 provides an enlarged view of the imaging pixel array at the image sensor 212. It is to be noted that the enlarged view in FIG. 3 shows an area where only imaging pixels are present. The imaging pixels include three different types of pixels, i.e., green pixels 310, red pixels 311 and blue pixels 312, which are two-dimensionally disposed in a Bayer array. As shown in FIG. 6, the imaging pixels (green pixels 310, red pixels 311 and blue pixels 312) each include a micro-lens 10, a photoelectric conversion unit 11 and a color filter (not shown). The color filters at the individual imaging pixels each assume one of the three colors, red (R), green (G) or blue (B) and the red, green and blue color filters assume spectral characteristics shown in FIG. 9.

Figure 4:
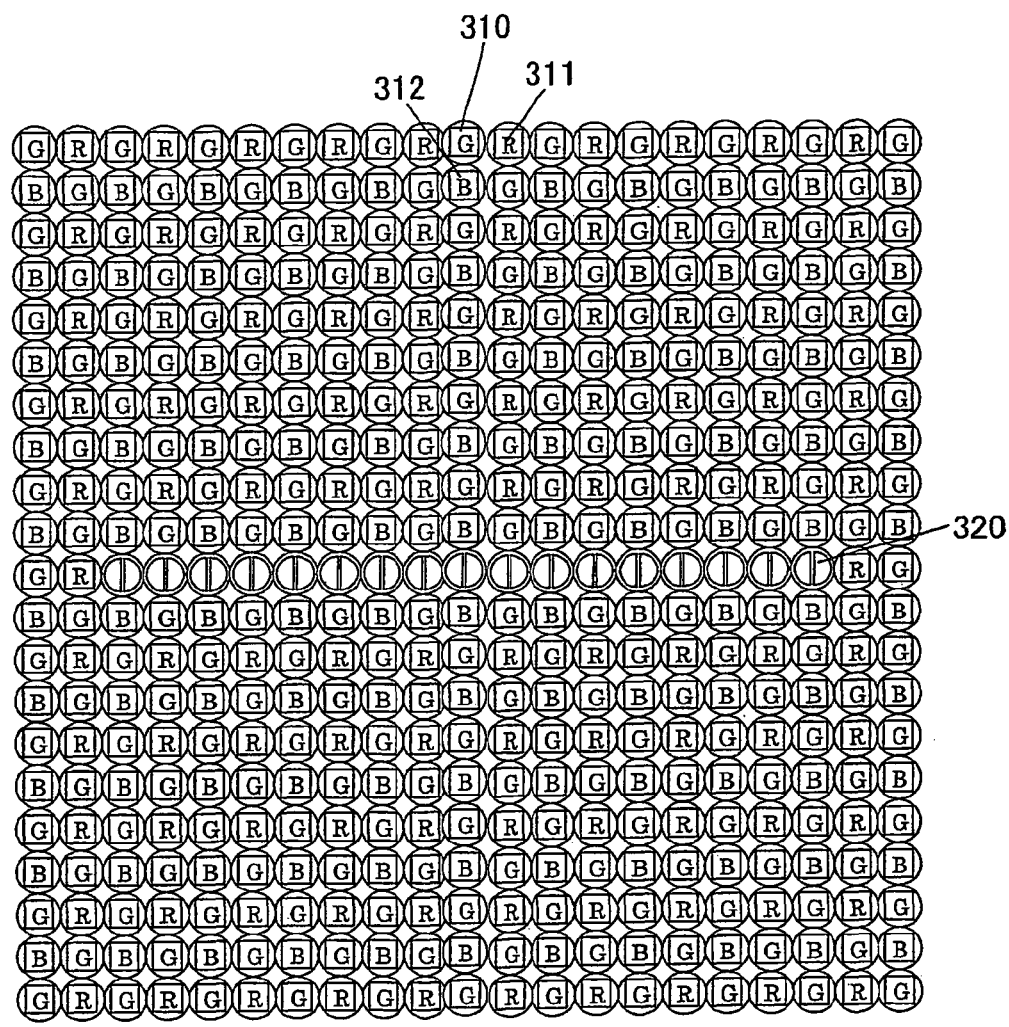
FIG. 4 is an enlarged view of an area over which focus detection pixels are arrayed along the horizontal direction at the image sensor in FIG. 2.
Figure 5:
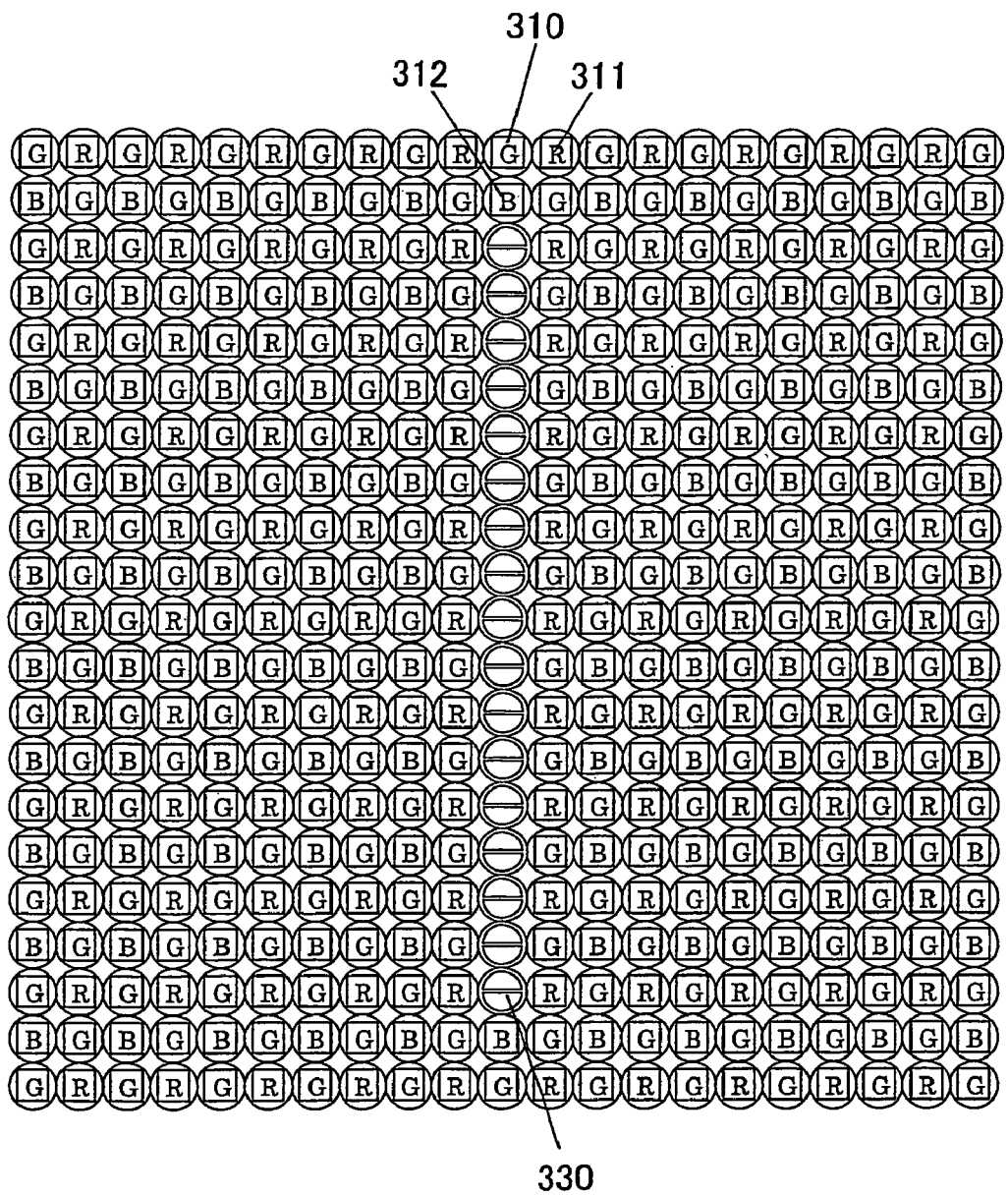
FIG. 5 is an enlarged view of an area over which focus detection pixels are arrayed along the vertical direction at the image sensor in FIG. 2.

FIGS. 4 and 5 each provide an enlarged view of a focus detection pixel arrangement at the image sensor 212. It is to be noted that FIG. 4 is an enlarged view of one of the areas over which focus detection pixels are disposed along the horizontal direction in FIG. 2 (one of the areas indicated by the filled rectangles). FIG. 4 shows focus detection pixels 320 disposed successively along the horizontal direction, forming a focus detection area. The arrangement of the focus detection pixels 320 is surrounded by imaging pixels. FIG. 5 is an enlarged view of one of the areas over which focus detection pixels are disposed along the vertical direction in FIG. 2 (one of the areas indicated by the unfilled rectangles). FIG. 5 shows focus detection pixels 330 disposed successively along the vertical direction, forming a focus detection area. The arrangement of the focus detection pixels 330 is surrounded by imaging pixels.

Figure 7:
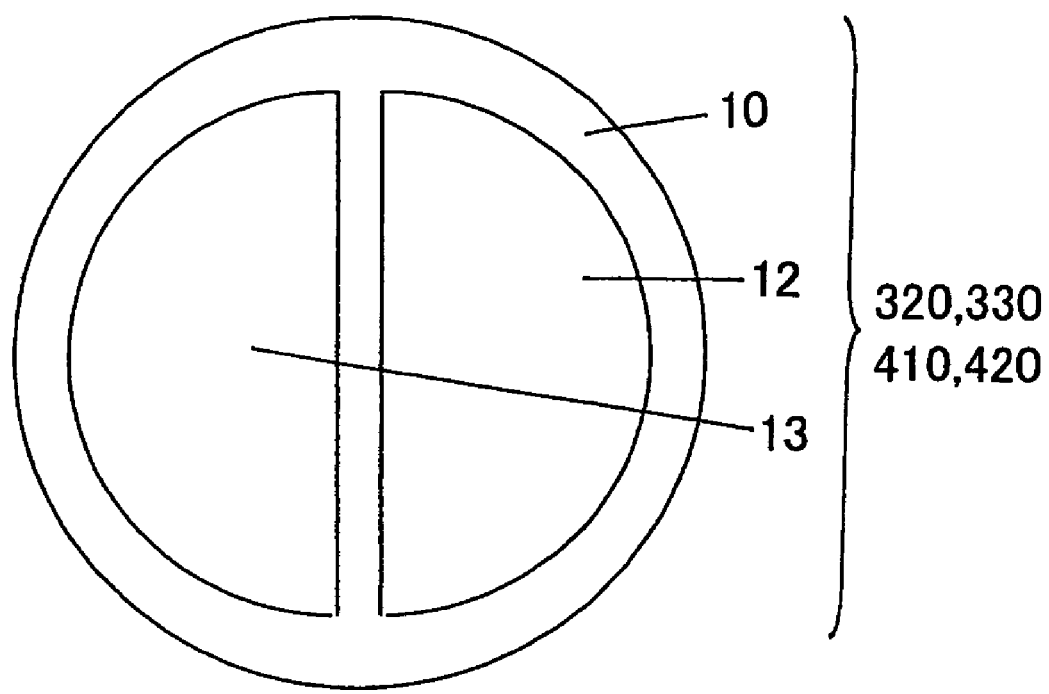
FIG. 7 shows the structure of the focus detection pixels.
Figure 10:
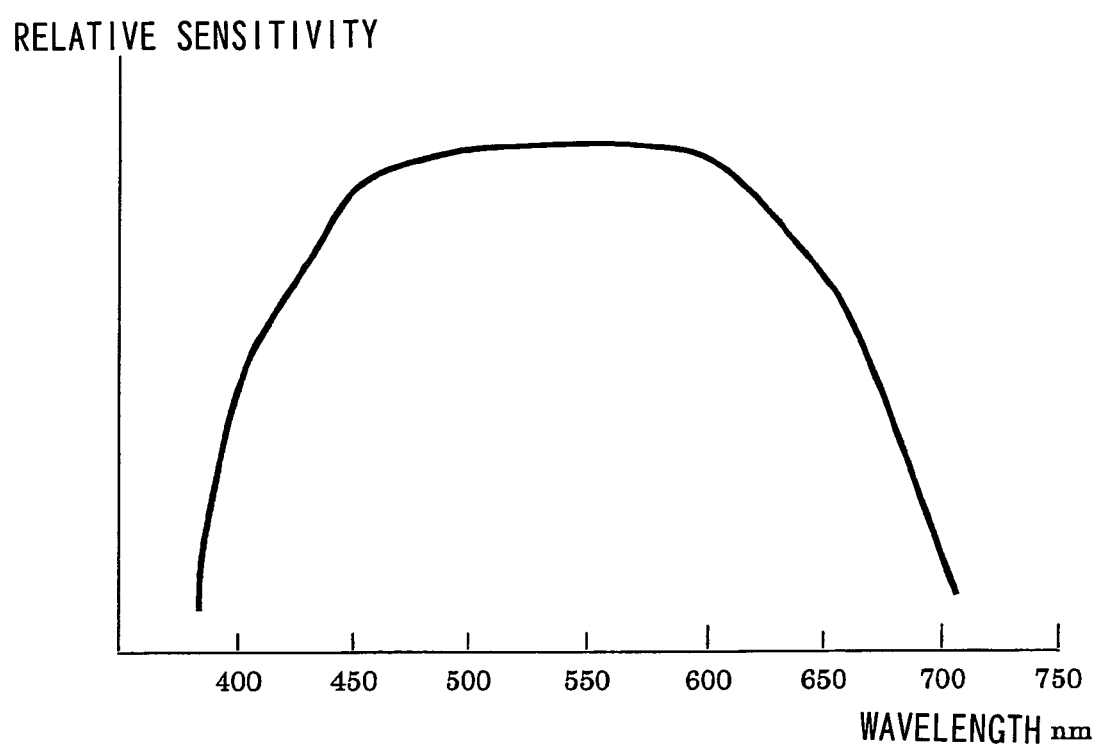
FIG. 10 shows the spectral characteristics of the focus detection pixels.

As shown in FIG. 7, the focus detection pixels 320 and 330 each include a micro-lens 10 and a pair of photoelectric conversion units 12 and 13. A focus detection pixel 330 assumes a structure achieved by rotating a focus detection pixel 320 by 90°. It is to be noted that the pair of photoelectric conversion units in the focus detection pixel may range over smaller areas, as do the photoelectric conversion units 14 and 15 shown in FIG. 8. Focus detection pixels 340 and 350, which may include such photoelectric conversion units 14 and 15 taking up smaller areas, are to be described in detail later. In order to assure a sufficient light quantity, no color filters are disposed at the focus detection pixels 320 and 330 and thus, the focus detection pixels have the spectral characteristics shown in FIG. 10, which are achieved by integrating the spectral sensitivity of the photodiodes engaged in photoelectric conversion and the spectral characteristics of the infrared cut filters (not shown). Namely, the spectral characteristics of the focus detection pixels 320 and 330 are similar to the sum of the spectral characteristics of the green pixels (G), the red pixels (R) and the blue pixels (B) shown in FIG. 9, which indicate sensitivity in a light wavelength range containing the light wavelength ranges corresponding to the sensitivity characteristics of all the pixels, i.e., the green pixels, the red pixels and the blue pixels.

The photoelectric conversion unit 11 at the imaging pixel shown in FIG. 6 is designed with a shape that allows the entire light flux defined by a specific aperture opening diameter (e.g., F 1.0) to be received via the micro-lens 10. The pair of photoelectric conversion units 12 and 13 at the focus detection pixel shown in FIG. 7 are designed with a shape that allows the entire light flux defined by a specific aperture opening diameter (e.g., F 2.8) to be received via the micro-lens 10. During an imaging operation (an image-capturing operation), the image data generated at the imaging pixels are directly used. The image data at the focus detection pixel positions are interpolated by using the image data generated at imaging pixels present in the vicinity of the focus detection pixels.

It is to be noted that image data may be interpolated by adopting another interpolation method. For instance, image data may be interpolated by adopting the interpolation method disclosed in U.S. patent application Ser. No. 11/702,605 filed Feb. 6, 2007, U.S. patent application Ser. No. 11/704,198 filed Feb. 9, 2007 or U.S. patent application Ser. No. 11/704,200 filed Feb. 9, 2007.

In FIGS. 4 and 5, image data are interpolated for a focus detection pixel assuming a position that would otherwise be occupied by a blue imaging pixel by averaging the image data at the blue pixel directly to the right of (directly above) the green pixel adjacent to the target focus detection pixel on the right side (on the upper side) and the image data at the blue pixel directly to the left of (directly below) the green pixel adjacent to the target focus detection pixel on the left side (on the lower side). In addition, image data are interpolated for a focus detection pixel assuming a position that would otherwise be occupied by a green imaging pixel by averaging the image data at the four green pixels disposed next to the target focus detection pixel along 45° diagonal directions, i.e., upper-right, lower-right, upper-left and lower-left relative to the target focus detection pixel.

Figure 11:
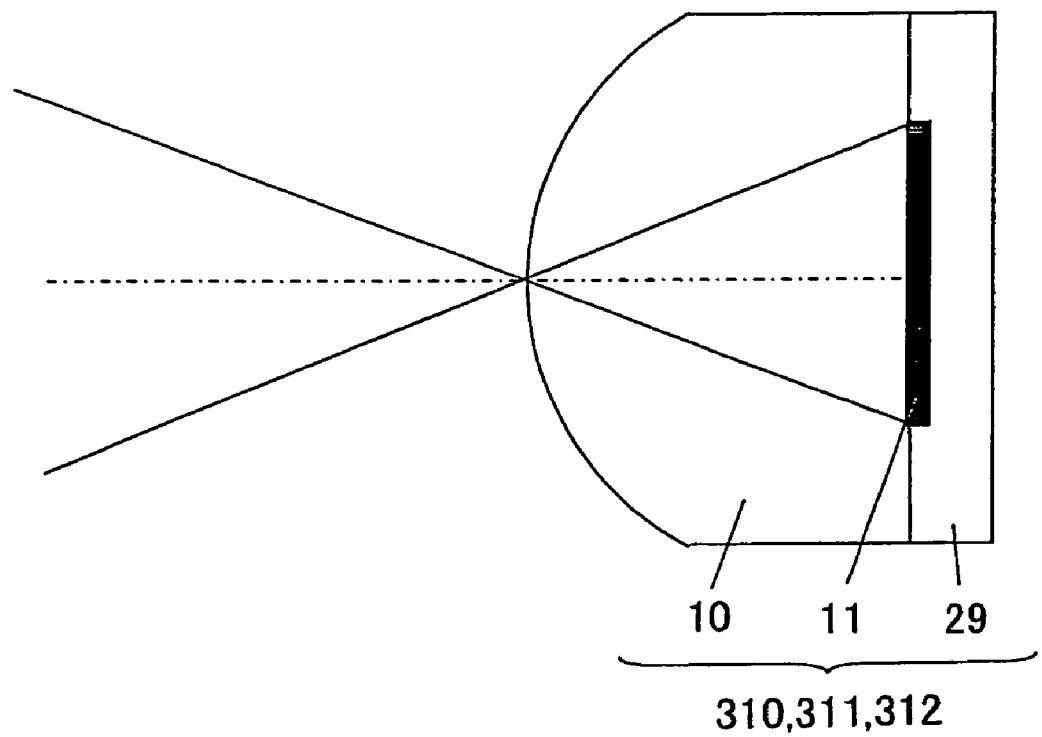
FIG. 11 is a lateral sectional view of an imaging pixel.

FIG. 11 shows an imaging pixel in a sectional view. The micro-lens 10 is disposed to the front of the imaging photoelectric conversion unit 11 at the imaging pixel so that the photoelectric conversion unit 11 is projected along the forward direction via the micro-lens 10. The photoelectric conversion unit 11 is formed on a semiconductor circuit substrate 29. It is to be noted that the color filter (not shown) is disposed between the micro-lens 10 and the photoelectric conversion unit 11.

Figure 12:
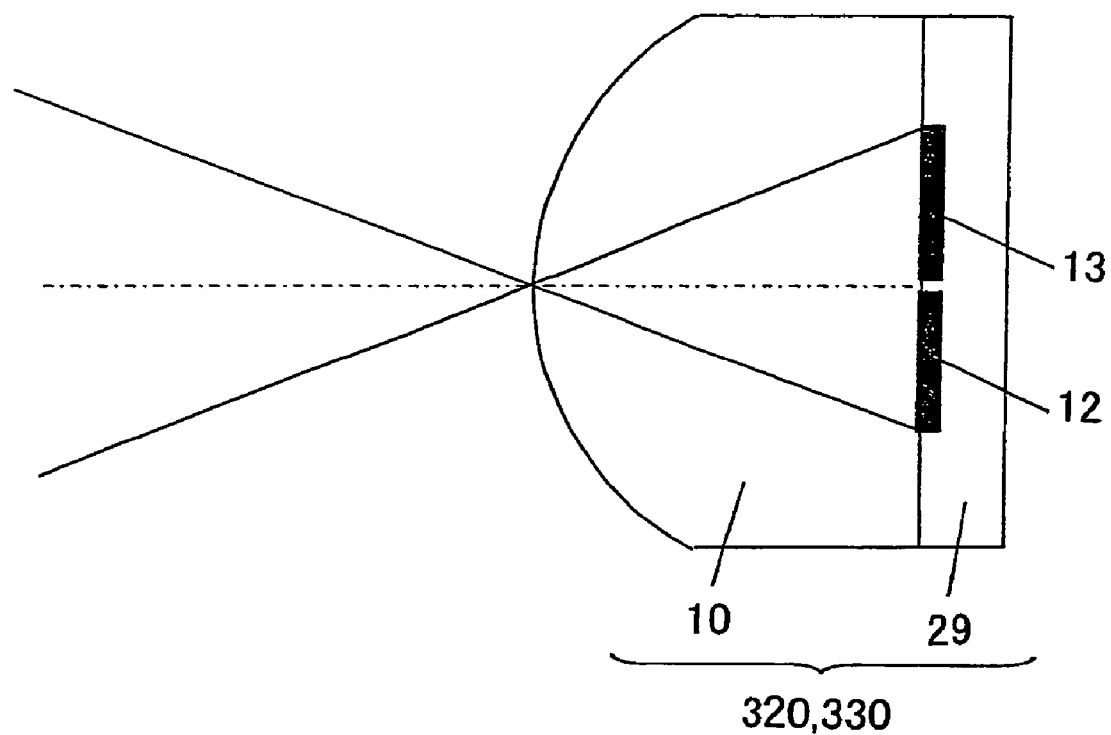
FIG. 12 is a lateral sectional view of a focus detection pixel.

FIG. 12 shows a focus detection pixel in a sectional view. The micro-lens 10 is disposed to the front of the focus detection photoelectric conversion units 12 and 13 at the focus detection pixel so that the photoelectric conversion units 12 and 13 are projected along the forward direction via the micro-lens 10. The photoelectric conversion units 12 and 13 are formed on the semiconductor circuit substrate 29.

Figure 13:
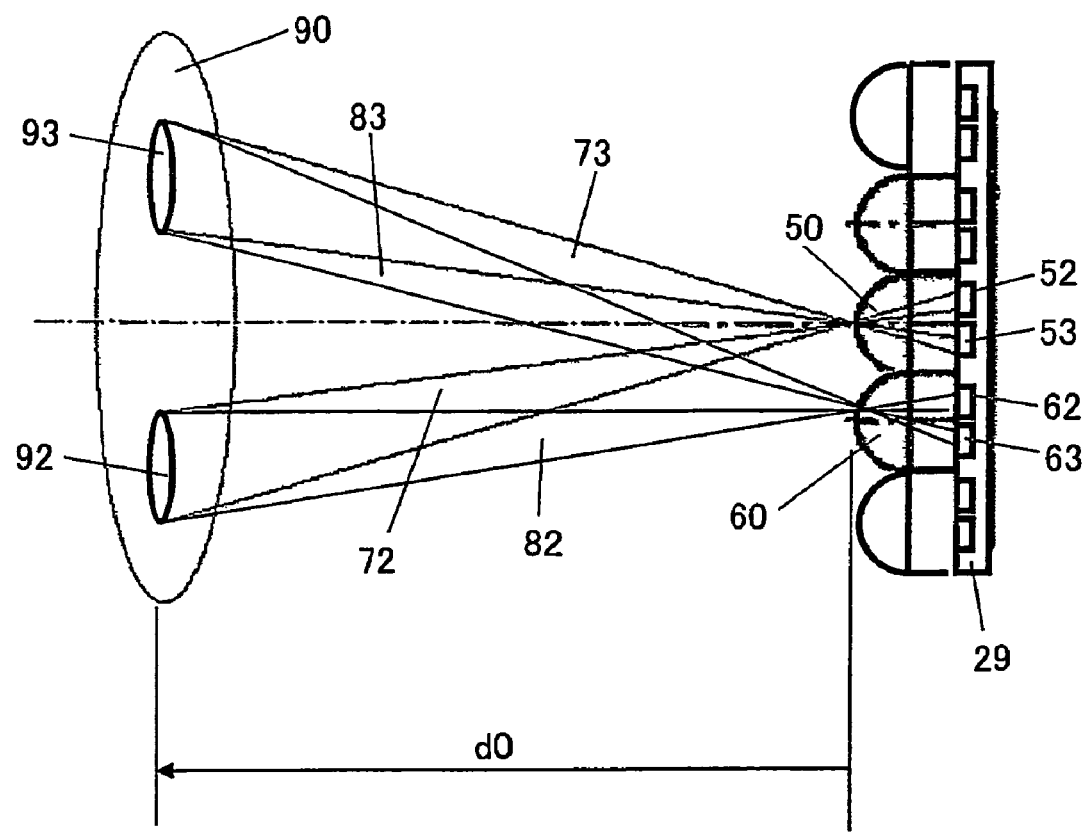
FIG. 13 illustrates focus detection executed through the split pupil method by using micro lenses.

FIG. 13 illustrates how focus detection may be executed through the split pupil method by using micro-lenses. Reference numeral 90 indicates an exit pupil set along the forward direction over a distance d0 from the micro-lenses disposed on the predetermined imaging plane of the interchangeable lens. The distance d0 is a "rangefinding pupil distance" determined based upon the curvature and the refractive index of the micro-lenses, the distance between the micro-lenses and the photoelectric conversion units and the like. Reference numerals 50 and 60 each indicate a micro-lens, whereas (52, 53) and (62, 63) each indicate a pair of photoelectric conversion units at a focus detection pixel and (72, 73) and (82, 83) indicate focus detection light fluxes. In addition, reference numeral 92 indicates a range defined by the photoelectric conversion units 52 and 62 projected via the micro-lenses 50 and 60 (hereafter referred to as a rangefinding pupil) and reference numeral 93 indicates a range defined by the photoelectric conversion units 53 and 63 projected via the micro-lenses 50 and 60 (rangefinding pupil).

While FIG. 13 schematically illustrates a focus detection pixel (comprising the micro-lens 50 and a pair of photoelectric conversion units 52 and 53) set on the optical axis and an adjacent focus detection pixel (comprising the micro-lens 60 and a pair of photoelectric conversion units 62 and 63) in a simple representation, the light fluxes arriving from the pair of rangefinding pupils at the micro-lens of a focus detection pixel disposed at a peripheral position away from the optical axis are also received at the corresponding pair of photoelectric conversion units. The focus detection pixels are disposed along the direction in which the pair of rangefinding pupils are set side by side, i.e., the direction along which the photoelectric conversion units in each pair are set side by side.

The micro-lenses 50 and 60 are set around the predetermined imaging plane of the optical system. The shapes of the pair of photoelectric conversion units 52 and 53 disposed to the rear of the micro-lens 50 are projected via the micro-lens 50 onto the exit pupil 90 set apart from the micro-lenses 50 and 60 by the projection distance d0 and the projected shapes define range-finding pupils 92 and 93. The shapes of the pair of photoelectric conversion units 62 and 63 disposed to the rear of the micro-lens 60 are projected via the micro-lens 60 set onto the exit pupil 90 set apart by the projection distance d0 and the projected shapes define range-finding pupils 92 and 93. Namely, the projecting direction for each pixel is determined so that the projected shapes (range-finding pupils 92 and 93) of the photoelectric conversion units in the individual focus detection pixels are aligned on the exit pupil 90 set over the projection distance do. This means that the pair of rangefinding pupils 92 and 93 and the pair of photoelectric conversion units (52, 53) have a conjugate relationship to each other via the micro-lens 50 and that the pair of rangefinding pupils 92 and 93 and the pair of photoelectric conversion units (62, 63) have a conjugate relationship to each other via the micro-lens 60.

The photoelectric conversion unit 52 outputs a signal corresponding to the intensity of an image formed on the micro-lens 50 with the focus detection light flux 72 having passed through the range-finding pupil 92 toward the micro-lens 50. The photoelectric conversion unit 53 outputs a signal corresponding to the intensity of an image formed on the micro-lens 50 with the focus detection light flux 73 having passed through the range-finding pupil 93 toward the micro-lens 50. The photoelectric conversion unit 62 outputs a signal corresponding to the intensity of an image formed on the micro-lens 60 with a focus detection light flux 82 having passed through the range-finding pupil 92 and having advanced toward the micro-lens 60. The photoelectric conversion unit 63 outputs a signal corresponding to the intensity of an image formed on the micro-lens 60 with the focus detection light flux 83 having passed through the range-finding pupil 93 toward the micro-lens 60.

A plurality of focus detection pixels each structured as described above are arranged in a straight line and the outputs from the pairs of photoelectric conversion units at the individual pixels are integrated into output groups each corresponding to one of the two range-finding pupils 92 and 93. Thus, information related to the intensity distribution of the pair of images formed on the focus detection pixel arrangement with the individual focus detection light fluxes passing through the range-finding pupil 92 and the range-finding pupil 93 is obtained. Next, image shift detection calculation processing (correlation processing, phase difference detection processing) to be detailed later is executed by using the information thus obtained so as to detect the extent of image shifting (misalignment) manifested by the pair of images through the split-pupil phase difference detection method. Namely, through conversion calculation executed on the image shift quantity (image misalignment quantity) in correspondence to the distance between the gravitational centers of the pair of rangefinding pupils, the extent of the deviation (defocus amount) of the current image forming plane (the image forming plane on which the image is formed at the focus detection position corresponding to a specific micro-lens array position on the predetermined imaging plane) relative to the predetermined imaging plane is calculated.

It is to be noted that while the explanation is provided above by assuming that the rangefinding pupils are not restricted (no vignetting or not eclipsed) by an opening restricting element (the aperture opening, the lens exterior contour, the hood or the like) of the interchangeable lens, the photoelectric conversion units at the focus detection pixels will receive light fluxes having passed through restricted rangefinding pupils as the focus detection light fluxes if the rangefinding pupils are restricted by an opening restricting element of the interchangeable lens.

Figure 14:
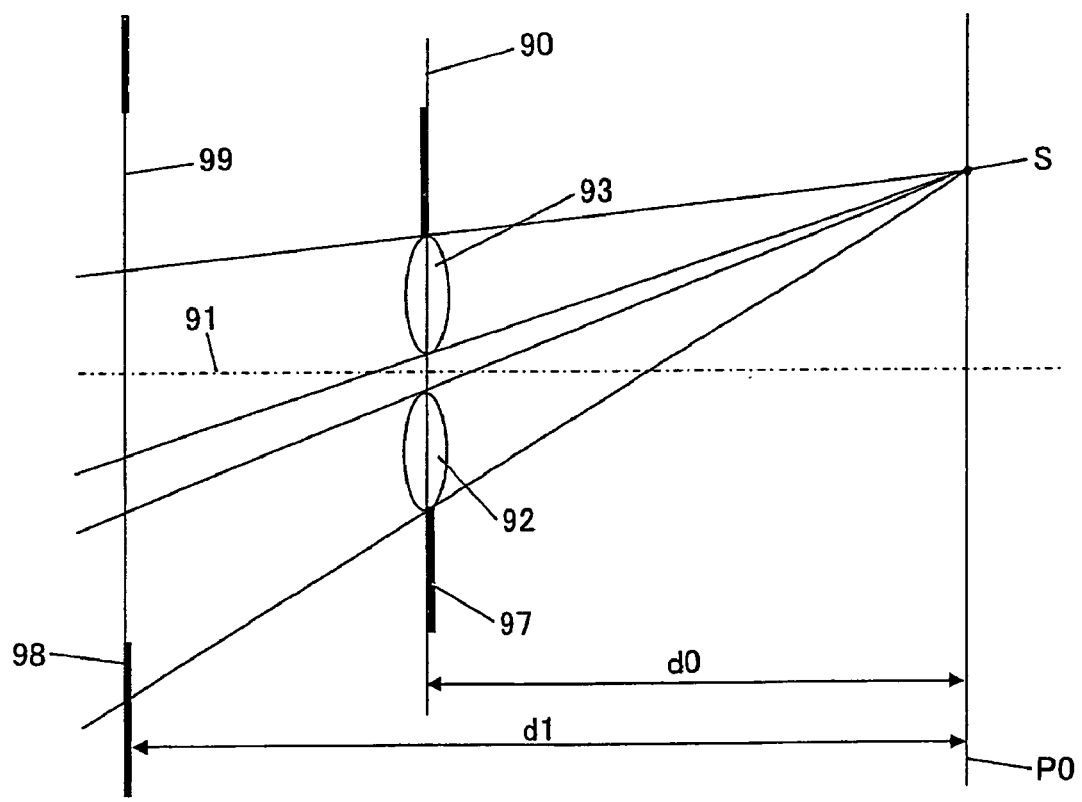
FIG. 14 illustrates vignetting of a range-finding pupil in a focus detection area away from the image plane center.

FIG. 14 illustrates how a rangefinding pupil may have vignetting over a focus detection area away from the image plane center. As shown in FIG. 14, when the focus detection area assumes a position S in the periphery of the image plane set at the predetermined focal plane PO, the rangefinding pupils 92 and 93 do not have vignetting because of an aperture opening 97 at the exit pupil 90, but an opening restricting element 98 (an aperture stop, a lens edge or the like) present at a plane 99 further away from the exit pupil 90 causes vignetting (an eclipse) at the rangefinding pupil 92. The opening of the restricting element 98 is offset relative to the rangefinding pupils 92 and 93 along the direction in which the image plane center is connected with the focus detection position S by an extent corresponding to the distance between the image plane center and the focus detection position S.

Figure 15:
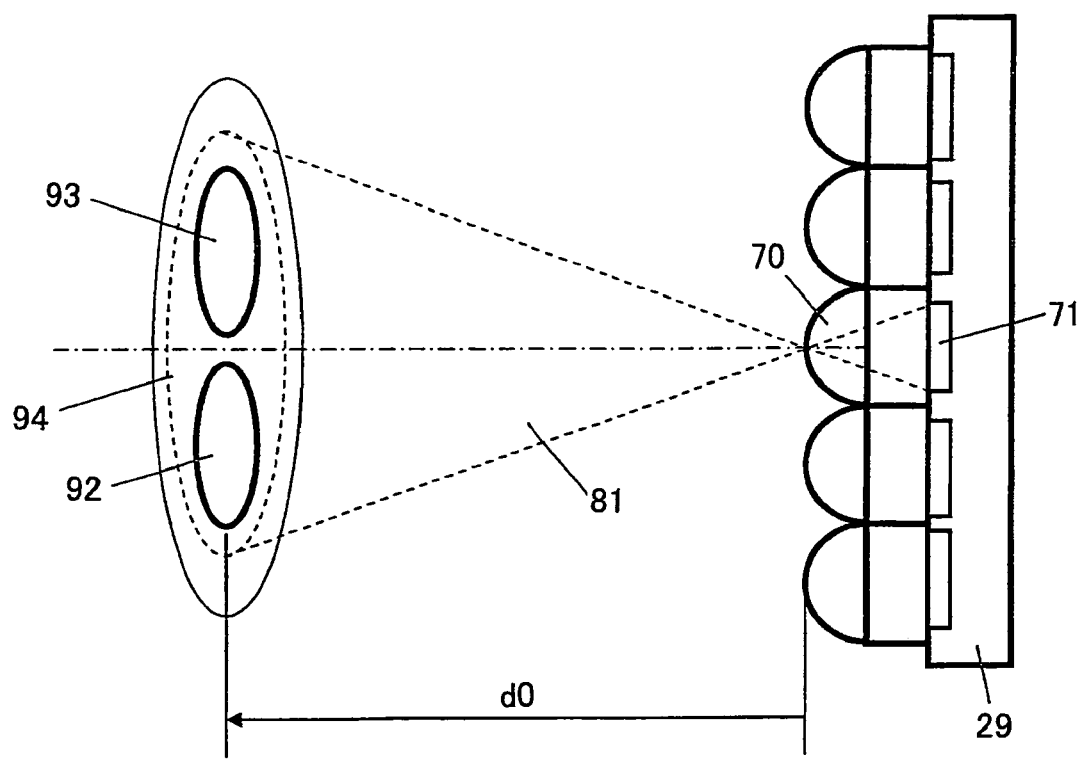
FIG. 15 shows the relationship between the imaging pixels and the exit pupil.

FIG. 15 illustrates the relationship between imaging pixels and the exit pupil. It is to be noted that the following explanation is provided by using the same reference numerals assigned to elements similar to those shown in FIG. 13. Reference numeral 70 indicates a micro-lens, reference numeral 71 indicates the photoelectric conversion unit of an imaging pixel and reference numeral 81 indicates an imaging light flux. In addition, reference numeral 94 indicates an area defined by the photoelectric conversion unit 71 projected via the micro-lens 70. While FIG. 15 schematically illustrates the imaging pixel (comprising the micro-lens 70 and the photoelectric conversion unit 71) set on the optical axis, the photoelectric conversion units at other imaging pixels, too, receive the light flux arriving at the corresponding micro-lenses from the area 94.

The micro-lens 70 is disposed around the predetermined imaging plane of the optical system and the shape of the photoelectric conversion unit 71 disposed to the rear of the micro-lens 70 is projected via the micro-lens 70 onto the exit pupil 90 set apart from the micro-lens 70 by the projection distance d0 with the projected shape defining the area 94. The photoelectric conversion unit 71 outputs a signal corresponding to the intensity of the image formed on the micro-lens 70 with the imaging light flux 81 having passed through the area 94 toward the micro-lens 70. By disposing numerous such imaging pixels in a two-dimensional array, image information is obtained via the photoelectric conversion units at the individual pixels.

Figure 16:
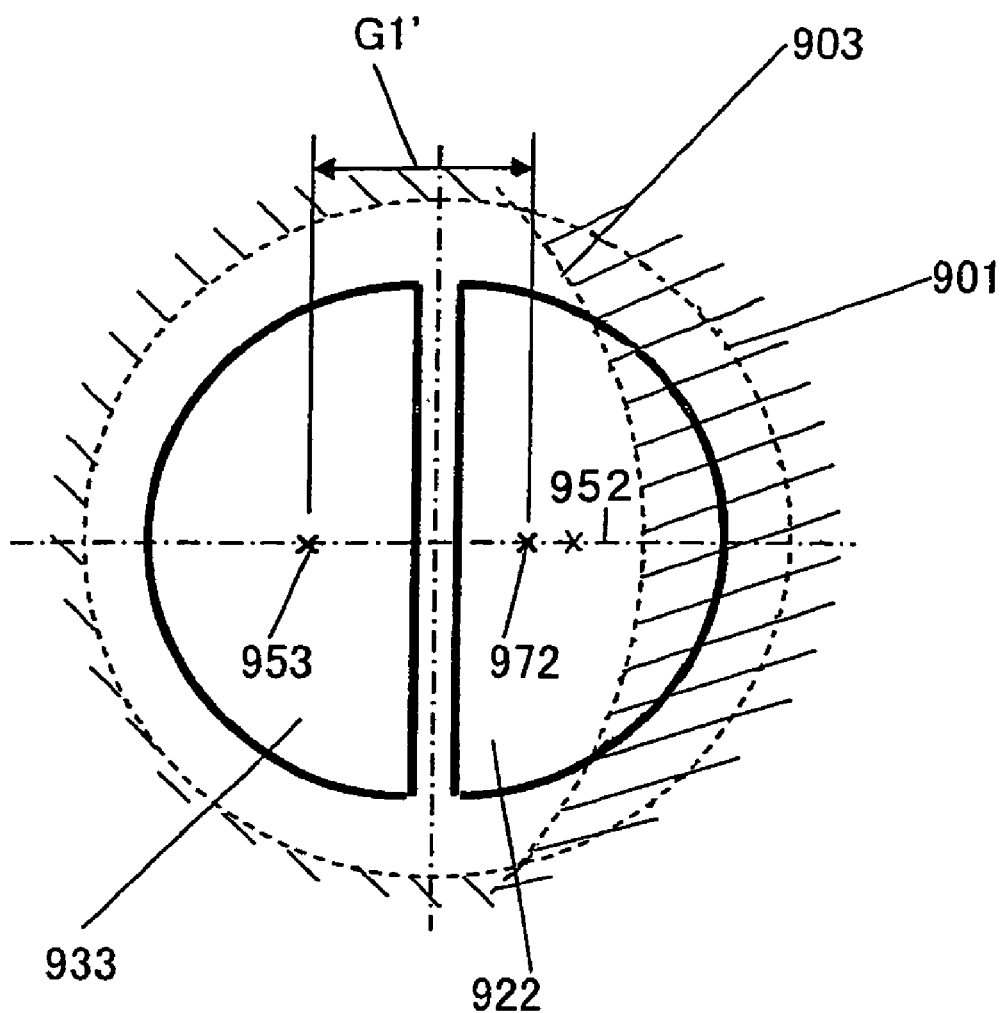
FIG. 16 is a front view of the range-finding pupils on the exit pupil plane.
Figure 17:
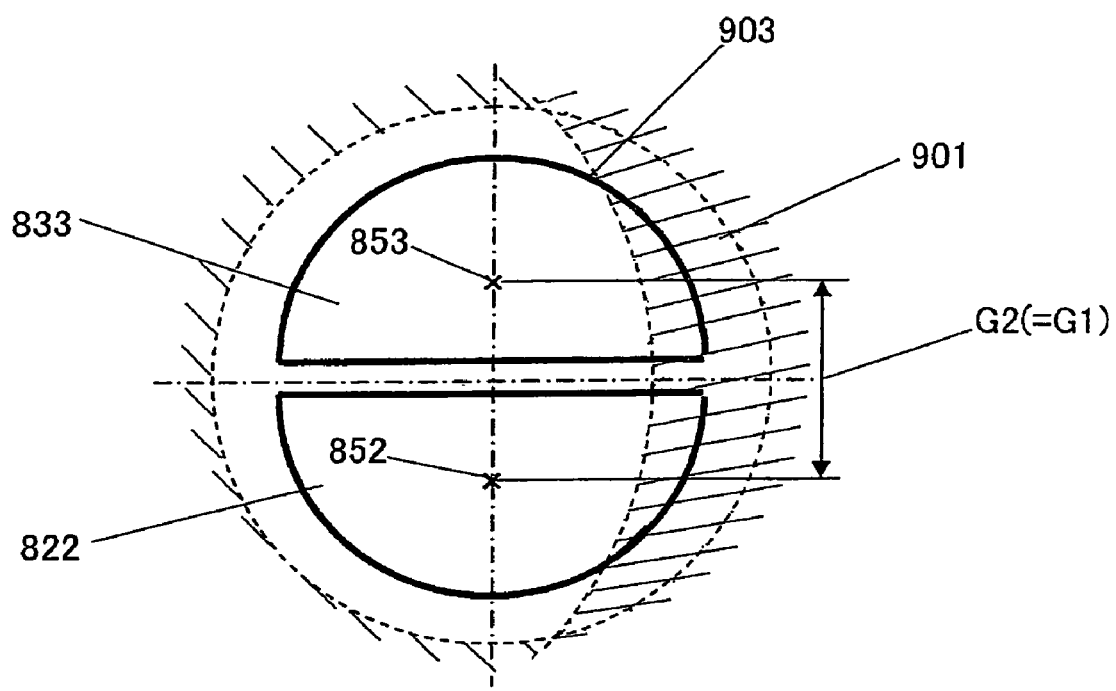
FIG. 17 is a front view of the range-finding pupils on the exit pupil plane.

FIGS. 16 and 17 each present a front view of the rangefinding pupils at the exit pupil plane, illustrating how vignetting (an eclipse) may occur at a rangefinding pupil when the focus detection area assumes the position S within either of the regions 110 and 130 separated from each other along the horizontal direction to range on the two sides of the image plane center, as shown in FIG. 2. The circle circumscribing rangefinding pupils 922 and 933 formed by projecting a pair of photoelectric conversion units at a focus detection pixel 320 onto the exit pupil 90 via the micro-lens defines a specific aperture F value in case of viewing from an image forming plane (hereafter referred to as a rangefinding pupil F value, equivalent to F 2.8 in this example) in FIG. 16. An area 901 indicated by the dotted line corresponds to an aperture value (e.g. F2) greater than the aperture value F 2.8, and contains therein the rangefinding pupils 922 and 933. The distance between gravitational centers 952 and 953 of light fluxes (focus detection light fluxes) passing through the rangefinding pupils 922 and 933 measured along the direction in which the rangefinding pupils 922 and 933 are set side by side (the left/right direction in the figure), is G1.

If a focus detection light flux has vignetting as shown in FIG. 14, the opening of the opening restricting element becomes offset relative to the rangefinding pupil along the horizontal direction to overlap the rangefinding pupil (an area 903 is part of the opening restriction). In this state, the rangefinding pupil 922 has vignetting by the area 903 and a gravitational center 972 of a light flux (focus detection light flux) passing through the rangefinding pupil 922 restricted by the area 903 is offset further toward the center than the gravitational center 952 of the light flux without vignetting. The rangefinding pupil 933, on the other hand, has no vignetting by the area 903 and thus, the position of the gravitational center 953 of the light flux (focus detection light flux) passing through the rangefinding pupil 933 remains unchanged. As a result, the distance between the range finding pupil gravitational centers 972 and 953 is narrower at G1', compared to the gravitational center distance G1 in no vignetting state.

In addition, the vignetting disrupts the ratio of the areas of the rangefinding-pupils and ultimately, the ratio of the intensity levels of the pair of images formed via the pair of range finding pupils becomes unstable. In other words, since the match of intensity levels (uniformity) is no longer assured, the focus detection accuracy is compromised and if the extent of vignetting is significant, the focus detection may be even disabled. Generally speaking, the extent of vignetting increases in proportion to the distance between the image plane center and the focus detection area.

The circle circumscribing the rangefinding pupils 822 and 833 formed by projecting the pair of photoelectric conversion units at a focus detection pixel 330 onto the exit pupil 90 via the micro-lens defines a specific aperture F value in case of viewing from an image forming plane (hereafter referred to as a rangefinding pupil F value, equivalent to F 2.8 in this example) in FIG. 17. An area 901 indicated by the dotted line corresponds to an aperture value (e.g. F2) greater than the aperture value F 2.8, and contains therein the rangefinding pupils 822 and 833, The distance between gravitational centers 852 and 853 of light fluxes (focus detection light fluxes) passing through the rangefinding pupils 822 and 833 measured along the direction in which the rangefinding pupils 822 and 833 are set side by side (the up/down direction in the figure), is G2 (=G1). If a focus detection light flux has vignetting as shown in FIG. 14, the opening of the opening restricting element becomes offset relative to the rangefinding pupil along the horizontal direction to overlap the rangefinding pupil (an area 903 is part of the opening restriction).

While the edges of the rangefinding pupils 822 and 833 on the right side are vignetted (eclipsed) by the area 903 in this state, vignetting occurs symmetrically for the range finding pupils 822 and 833 and thus, the presence of the area 903 hardly changes the gravitational center positions 852 and 853 of the rangefinding pupils 822 and 833. Consequently, the distance G2 between the gravitational centers 852 and 853 of the light fluxes (focus detection light fluxes) passing through the rangefinding pupils 822 and 833, too, remains unchanged. In addition, even in the event of vignetting, the areas of the pair of rangefinding pupils remain equal to each other and thus, the match (uniformity) between the pair of images formed via the pair of rangefinding pupils is sustained to maintain the focus detection accuracy.

As explained above, in the regions 110 and 130 separated from each other along the horizontal direction on the two sides of the image plane center 100 in FIG. 2, the desired focus detection performance can be maintained more easily in a focus detection area with focus detection pixels 330 disposed along the vertical direction rather than in a focus detection area formed by disposing focus detection pixels 320 along the horizontal direction. In the regions 150 and 170 separated from each other along the vertical direction on the two sides of the image plane center 100 in FIG. 2, on the other hand, the desired focus detection performance can be maintained more easily in a focus detection area with focus detection pixels 320 disposed along the horizontal direction rather than in a focus detection area formed by disposing focus detection pixels 330 along the vertical direction.

Next, the structure of the image sensor 212 shown in FIG. 2 and, in particular, specifically how the focus detection areas are set at the image sensor 212, are explained. By setting a plurality of focus detection areas each constituted with focus detection pixels 320 disposed along the horizontal direction and a plurality of focus detection areas each constituted with focus detection pixels 330 disposed along the vertical direction in each of the regions 110, 130, 150 and 170, the focus detection target can be captured at positions as much as possible on the image plane and, at the same time, any reduction in the focus detection performance attributable to image contrast directionality can be prevented.

In addition, in the image plane center area 107 where the focus detection target is highly likely to be present, the focus detection pixels 320 and the focus detection pixels 330 or focus detection areas each constituted with the focus detection pixels 320 arrayed along the horizontal direction and focus detection areas each constituted with focus detection pixels 330 arrayed along the vertical direction are disposed at higher density per unit area compared to the density of focus detection pixels or the focus detection areas in the middle area 108 and the peripheral area 109, so as to distribute the focus detection pixels 320 and the focus detection pixels 330 for maximum focus detection performance and maximum efficiency while keeping down the number of focus detection pixels.

In the regions 110 and 130 separated from each other along the horizontal direction on the two sides of the image plane center, focus detection pixels 330 are disposed in a greater number than focus detection pixels 320, whereas in the regions 150 and 170 separated from each other along the vertical direction on the two sides of the image plane center, focus detection pixels 320 are disposed in a greater number than focus detection pixels 330, so as to distribute the focus detection pixels 320 and the focus detection pixels 330 for maximum focus detection performance and maximum efficiency while keeping down the number of focus detection pixels by maintaining the required level of focus detection performance even in the event of vignetting.

In the regions 110 and 130 separated from each other along the horizontal direction on the two sides of the image plane center, focus detection areas each formed by arraying focus detection pixels 330 along the vertical direction are disposed in a greater number than focus detection areas each formed by arraying focus detection pixels 320 along the horizontal direction, whereas in the regions 150 and 170 separated from each other along the vertical direction on the two sides of the image plane center, focus detection areas each formed by arraying focus detection pixels 320 along the horizontal direction are disposed in a greater number than focus detection areas each formed by arraying focus detection pixels 330 along the vertical direction, so as to distribute the focus detection pixels 320 and the focus detection pixels 330 for maximum focus detection performance and maximum efficiency while keeping down the number of focus detection pixels by maintaining the required level of focus detection performance even in the event of vignetting.

In the area around the image plane center, manifestation of vignetting does not greatly affect the focus detection performance whereas an area further away from the image plane center is more affected by vignetting. Accordingly, in the regions 110 and 130 to the left and the right of the image plane center along the horizontal direction, fewer focus detection pixels 320 and fewer focus detection areas each formed by arraying focus detection pixels 320 along the horizontal direction are disposed with their density per unit area lowered as the distance from the image plane center increases. In addition, the relative ratios to the number of focus detection pixels 330 and the number of focus detection areas each formed by arraying focus detection pixels 330 along the vertical direction as well as the relative ratio to the density of the focus detection pixels 330, is reduced as the distance from the image plane center increases.

In the regions 150 and 170 to the upper side and the lower side of the image plane center along the vertical direction, fewer focus detection pixels 330 and fewer focus detection areas each formed by arraying focus detection pixels 330 along the vertical direction are disposed with their density per unit area lowered as the distance from the image plane center increases. In addition, the relative ratios to the number of focus detection pixels 320 and the number of focus detection areas each formed by arraying focus detection pixels 320 along the horizontal direction, as well as the relative ratio to the density of the focus detection pixels 320 is reduced as the distance from the image plane center increases. As a result, the focus detection pixels 320 and the focus detection pixels 330 are distributed so as to assure maximum focus detection performance and maximum efficiency while keeping down the number of focus detection pixels by maintaining the required level of focus detection performance even in the event of vignetting.

Only focus detection areas each formed by arraying focus detection pixels 330 along the vertical direction, at which the focus detection performance is not readily affected by vignetting, are disposed over peripheral areas within the regions 110 and 130 set to the left and to the right along the horizontal direction relative to the image plane center. Only focus detection areas each formed by arraying focus detection pixels 320 along the horizontal direction, at which the focus detection performance is not readily affected by vignetting, are disposed over peripheral areas within the regions 150 and 170 set on the upper side and on the lower side along the vertical direction relative to the image plane center. As a result, in the peripheral areas ranging along the horizontal direction to contain a plurality of focus detection areas, focus detection areas each formed by arraying focus detection pixels 330 along the vertical direction alone are disposed, whereas in the peripheral areas ranging along the vertical direction, focus detection areas each formed by arraying focus detection pixels 320 along the horizontal direction alone are disposed. Thus, the focus detection pixels 320 and the focus detection pixels 330 are distributed so as to assure maximum focus detection performance and maximum efficiency while keeping down the number of focus detection pixels by maintaining the required level of focus detection performance even in the event of vignetting.

Figure 18:
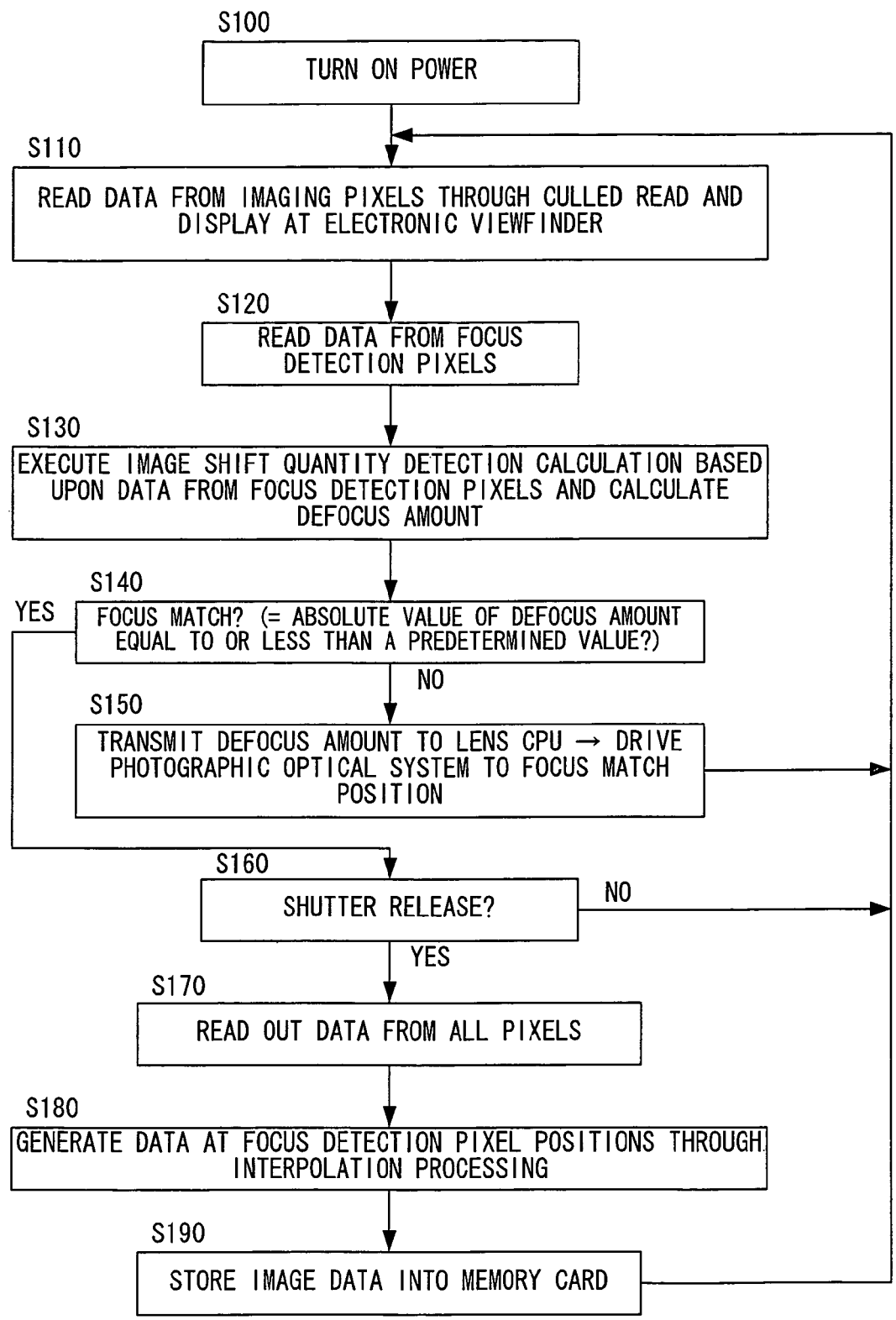
FIG. 18 presents a flowchart of the operations executed in the digital still camera (imaging device) shown in FIG. 1.

FIG. 18 presents a flowchart of the operation executed in the digital still camera (imaging device) shown in FIG. 1. The body drive control device 214 starts an imaging operation as the power to the camera is turned on in step 100. In step 110, aperture control information indicating a photographic aperture value automatically determined based upon the photographic field brightness measured via a photometering device (not shown) or a photographic aperture value manually set by the photographer via an operation member (not shown) is transmitted to the lens drive control device 206, the aperture opening diameter is set in correspondence to the photographic aperture value and data generated at the imaging pixels, read through a culled read in correspondence to the aperture opening diameter, are brought up on display at the electronic viewfinder.

In step 120, data are read out from a focus detection pixel row (i.e. a focus detection pixel string or a focus detection pixel group) with the aperture opening diameter set in correspondence to the photographic aperture value. In the following step 130, image shift detection calculation processing (correlation calculation processing) to be detailed later is executed based upon the pair of sets of image data corresponding to the particular focus detection pixel row to calculate an image shift quantity and ultimately calculate the defocus amount. It is to be noted that the photographer selects the focus detection area to be used in the focus detection. In step 140, a decision is made as to whether or not the current condition is close to a focus match state, i.e., whether or not the absolute value of the defocus amount having been calculated is equal to or less than a predetermined value. If it is decided that the current condition is not close to the focus match state, the operation proceeds to step 150 to transmit the calculated defocus amount to the lens drive control device 206 which then drives the focusing lens at the interchangeable lens to the focus match position. Then, the operation returns to step 110 to repeatedly execute the operation described above. It is to be noted that the operation also branches to this step if focus detection is not possible to transmit a scan drive instruction to the lens drive control device 206. In response, the lens drive control device drives the focusing lens at the interchangeable lens to scan between the infinity position and the close-up position. Subsequently, the operation returns to step 110 to repeatedly execute the operation described above.

If, on the other hand, it is decided in step 140 that the current condition is close to the focus match state, the operation proceeds to step 160 to make a decision as to whether or not a shutter release has occurred in response to an operation of the shutter release button (not shown). If it is decided that a shutter release has not yet occurred, the operation returns to step 110 to repeatedly execute the operation described above. If it is decided that a shutter release has occurred, the operation proceeds to step 170 to transmit the aperture control information to the lens drive control device 206 and thus set the aperture at the interchangeable lens to the photographic aperture value. As the aperture control ends, the image sensor is engaged in an imaging operation and image data originating from the imaging pixels and all the focus detection pixels at the image sensor 212 are read out. In step 180, image data at positions assumed by the individual pixels in the focus detection pixel row are interpolated based upon the data at surrounding imaging pixels. In step 190, image data constituted with the data at the imaging pixels 310 and the interpolated data are saved into the memory card, and then the Operation returns to step 110 to repeatedly execute the operation described above.

The image shift detection calculation processing (correlation calculation processing) executed in step 130 in FIG. 18 is now explained in detail. High-frequency cut filter processing such as that expressed in (1) below is executed on a pair of data strings ($\alpha_1 \sim \alpha_M$ and $\beta_1 \sim \beta_M$: M indicates the number of sets of data) output from the focus detection pixel row, so as to generate a first data string and a second data string ($A_1 \sim A_N$ and $B_1 \sim B_N$), from which a noise component or a high-frequency component that would adversely affect the correlation processing has been eliminated. $\alpha_1 \sim \alpha_M$ correspond to the image data of the image formed with the focus detection light fluxes passing through the rangefinding pupil 92 and $\beta_1 \sim \beta_M$ correspond to the image data of the image formed with the focus detection light fluxes passing through the rangefinding pupil 93 in FIG. 13. It is to be noted that the high-frequency cut filter processing may be skipped if the arithmetic operation needs to be completed faster or if the extent of defocusing is already significant and thus it is obvious that only a very small high-frequency component is present.

$$A_n = \alpha_n + 2 \times \alpha_{n+1} + \alpha_{n+2},$$

$$B_n = \beta_n + 2 \times \beta_{n+1} + \beta_{n+2} \text{ with } n=1 \sim N \quad (1)$$

A correlation quantity C(k) is calculated by executing a correlation calculation expressed in (2) on the data strings $A_n$ and $B_n$ calculated as expressed in (1).

$$C(k) = \Sigma |A_n - B_{n+k}| \quad (2)$$

Figure 19A:
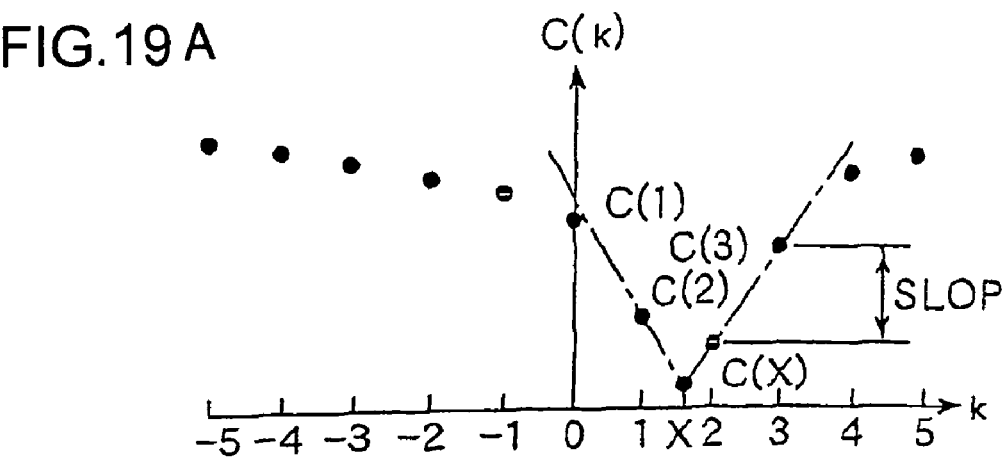
FIGS. 19A, 19B and 19C illustrate correlation calculation.

In expression (2), the $\Sigma$ operation is cumulatively executed with regard to n and the range assumed for n is limited to the range over which the data $A_n$ and $B_{n+k}$ exist in correspondence to a shift quantity k. In addition, the shift quantity k is an integer which represents a relative shift quantity assuming a value taken in units matching the data interval (pixel pitch) with which the data in the data strings are sampled. The results of the arithmetic operation executed as expressed in (2) may indicate that the correlation quantity C(k) assumes the smallest value (the smaller the value, the higher the correlation level) at the shift quantity at which the pair of sets of data achieve a high level of correlation (when k=kj=2 in FIG. 19A).

Next, the shift quantity x, which gives the smallest value C(x) in the continuous correlation quantity graph, is determined by adopting a three-point interpolation method expressed in (3)~(6) below.

$$x = kj + D/SLOP \quad (3),$$

$$C(x) = C(kj) - |D| \quad (4),$$

$$D = \{C(kj-1) - C(kj+1)\}/2 \quad (5),$$

$$SLOP = \text{MAX} \{C(kj+1) - C(kj), C(kj-1) - C(kj)\} \quad (6)$$

Figure 19B:
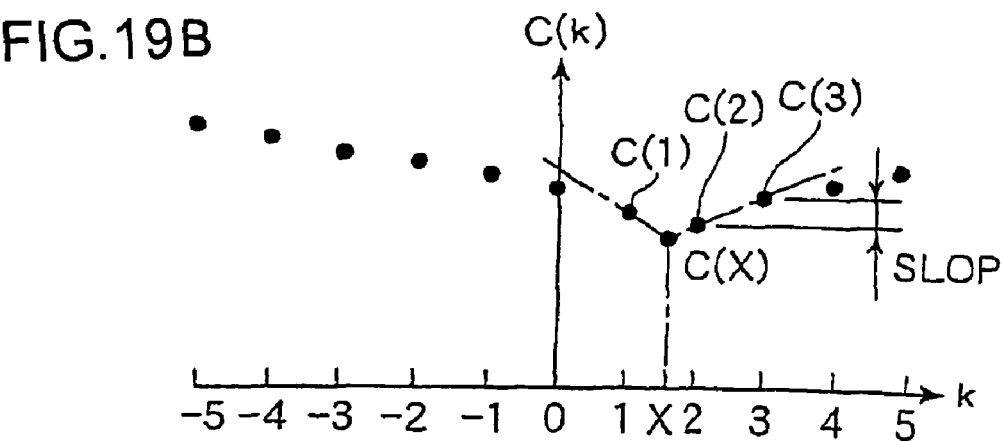
Figure 19C:
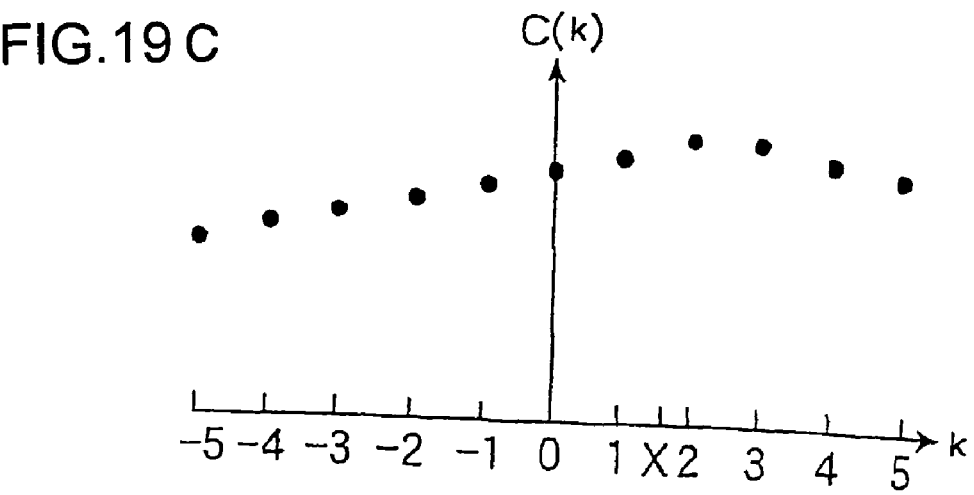

The judgment as to whether or not the shift quantity x calculated as expressed in (3) is reliable is made as follows. As shown in FIG. 19B, the interpolated minimal value C(x) of the correlation quantity increases when the level of correlation between the pair of sets of data is low. Accordingly, if C(x) is equal to or greater than a predetermined threshold value, the shift quantity is judged to be less reliable and the calculated shift quantity x is canceled. Alternatively, C(x) may be standardized with regard to the data contrast, and in such a case, if the value obtained by dividing C(x) by SLOP indicating a value in proportion to the contrast is equal to or greater than a predetermined value, the calculated shift quantity should be judged to be not reliable and accordingly, the calculated shift quantity x should be canceled. As a further alternative, if SLOP indicating the value in proportion to the contrast is equal to or less than a predetermined value, the subject should be judged to be a low-contrast subject, the reliability of the calculated shift quantity should be judged to be low and accordingly, the calculated shift quantity x should be canceled. If the level of correlation between the pair of sets of data is low and the correlation quantity C(x) does not dip at all over the shift range kmin to kmax, as shown in FIG. 19C, the minimal value C(x) cannot be determined. In this case, it is decided that focus detection cannot be executed.

If the calculated shift quantity x is judged to be reliable, the defocus amount DEF indicating the extent of defocusing of the subject image plane relative to the predetermined imaging plane can be calculated as expressed in (7) below.

$$DEF = KX \cdot PY \cdot x \quad (7)$$

PY in expression (7) represents the detection pitch (the pitch at which the focus detection pixels are disposed), whereas KX in expression (7) represents the conversion coefficient that is determined in correspondence to the opening angle formed by the gravitational centers of the light fluxes passing through the pair of rangefinding pupils.

It is to be noted that while an explanation is given above on an example in which a specific focus detection area is selected in advance from the plurality of focus detection areas, focus detection may instead be executed simultaneously in a plurality of focus detection areas and, in such a case, based upon the plurality of sets of focus detection results obtained through calculation, the ultimate focus detection results may be obtained by using a specific algorithm (e.g., averaging processing).

Examples of Variations of the Embodiment of the Present Invention

Variation 1

Figure 20:
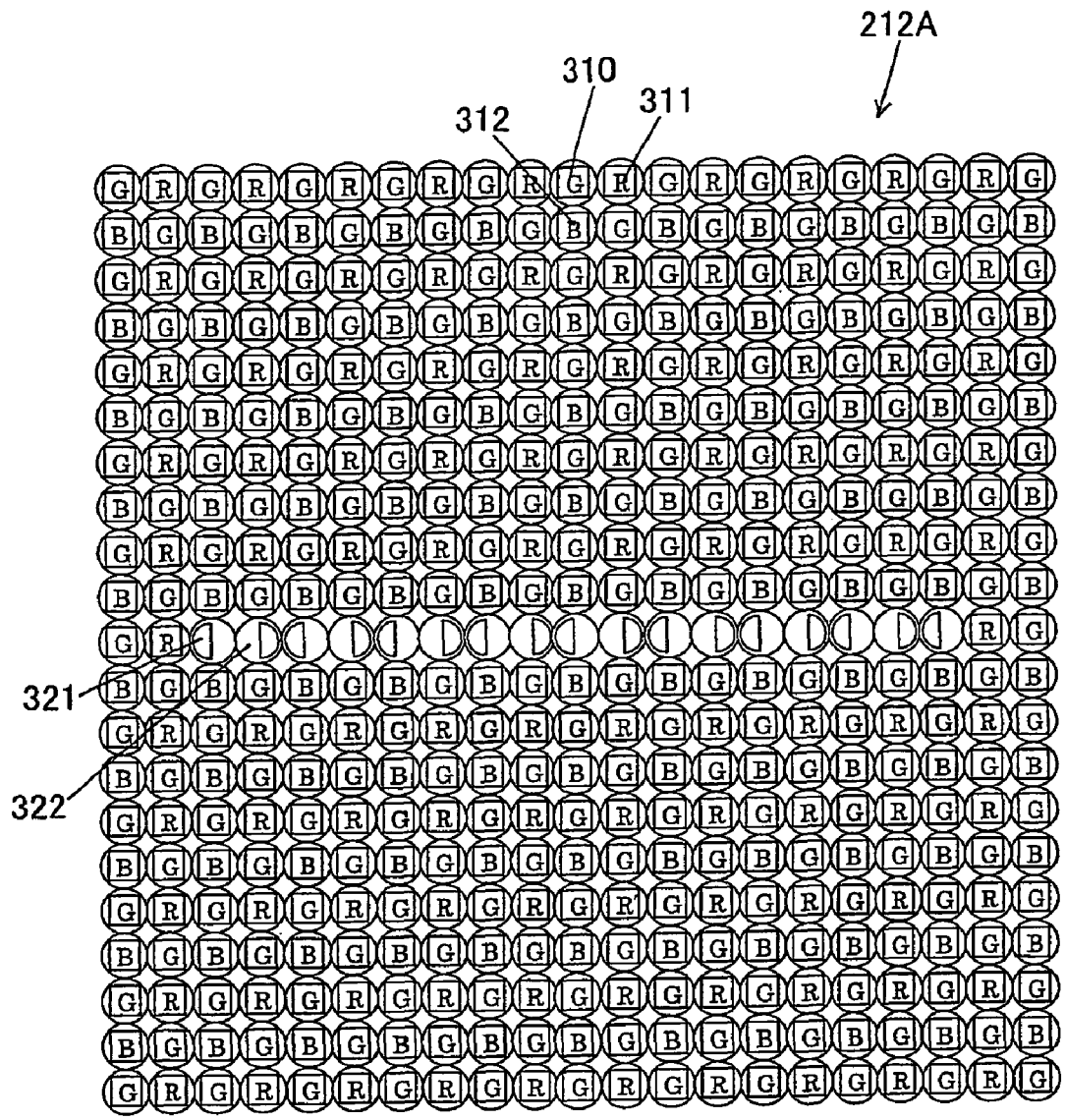
FIG. 20 is an enlarged view of a focus detection pixel arrangement at an image sensor achieved in a variation.
Figure 21:
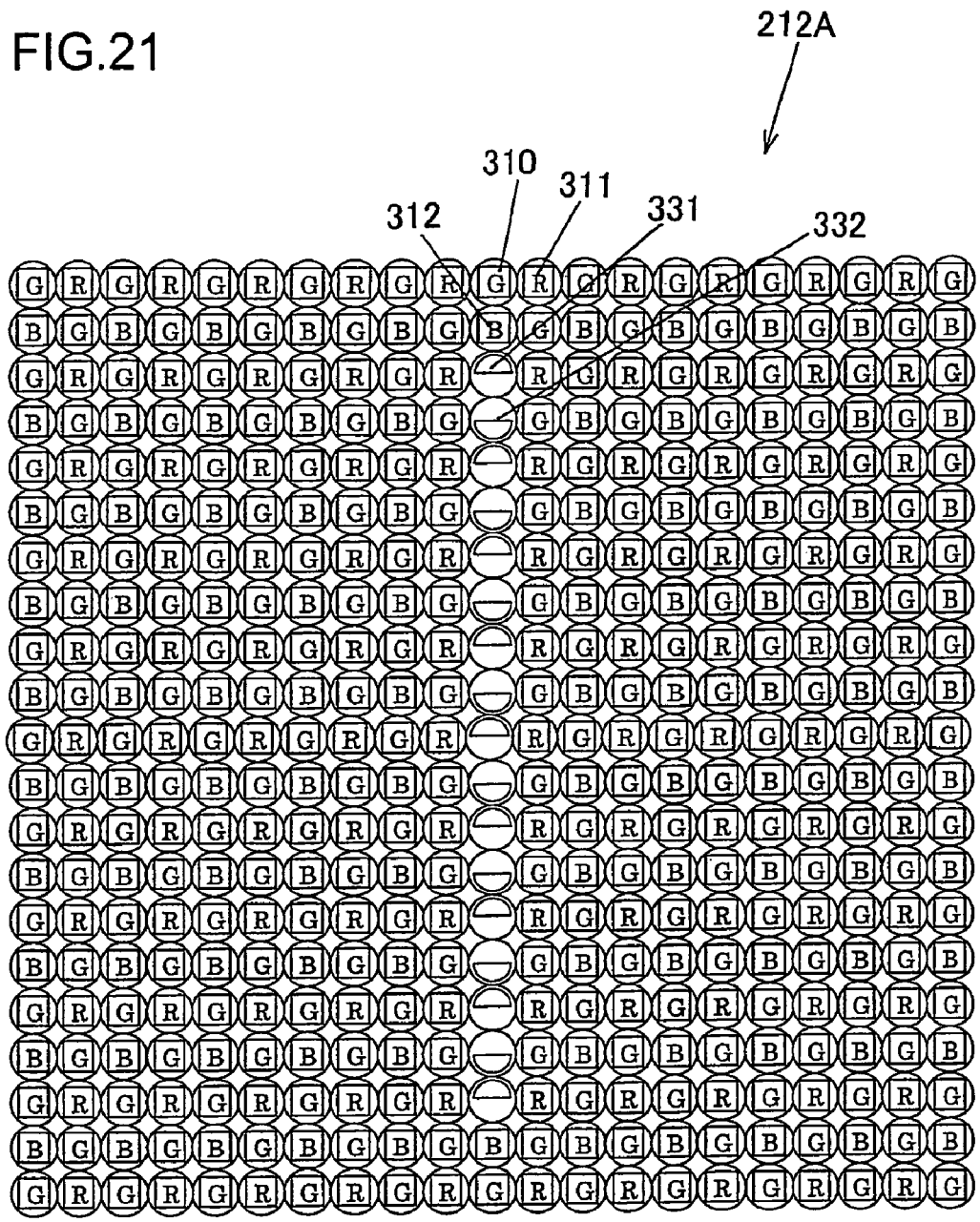
FIG. 21 is an enlarged view of a focus detection pixel arrangement at an image sensor achieved in a variation.

FIGS. 20 and 21 each provide an enlarged view of a focus detection pixel arrangement at an image sensor 212A achieved in a variation. While the focus detection pixels at the image sensor 212 in the embodiment shown in FIGS. 4 and 5 each include a pair of photoelectric conversion units corresponding to the pair of rangefinding pupils, a given focus detection pixel includes a single photoelectric conversion unit corresponding to one of the rangefinding pupils in the rangefinding pupil pair and an adjacent focus detection pixel includes a photoelectric conversion unit corresponding to the other rangefinding pupil in the rangefinding pupil pair at the image sensor 212A in the variation. Namely, the focus detection areas are each formed by arraying paired-up focus detection pixels. FIGS. 20 and 21 each show an area formed by disposing focus detection pixels as described above in an enlarged view.

The focus detection area shown in FIG. 20 corresponds to an area in FIG. 2 where focus detection pixels are disposed along the horizontal direction (an area indicated by a filled rectangle), whereas the focus detection area shown in FIG. 21 corresponds to an area in FIG. 2 where focus detection pixels are disposed along the vertical direction (an area indicated by an unfilled rectangle). The focus detection area in FIG. 20 is formed by successively arraying focus detection pixel pairs, each constituted of a focus detection pixel 321 and a focus detection pixel 322, along the horizontal direction. The arrangement constituted with the focus detection pixels 321 and 322 is surrounded by imaging pixels. The focus detection area in FIG. 21 is formed by successively arraying focus detection pixel pairs, each constituted of a focus detection pixel 331 and a focus detection pixel 332, along the vertical direction. The arrangement constituted with the focus detection pixels 331 and 332 is surrounded by imaging pixels.

Since focus detection pixels each equipped with a single photoelectric conversion unit are allowed to assume a circuit structure identical to the circuit structure of the imaging pixels, the overall circuit of the image sensor can be simplified.

Variation 2

Figure 8:
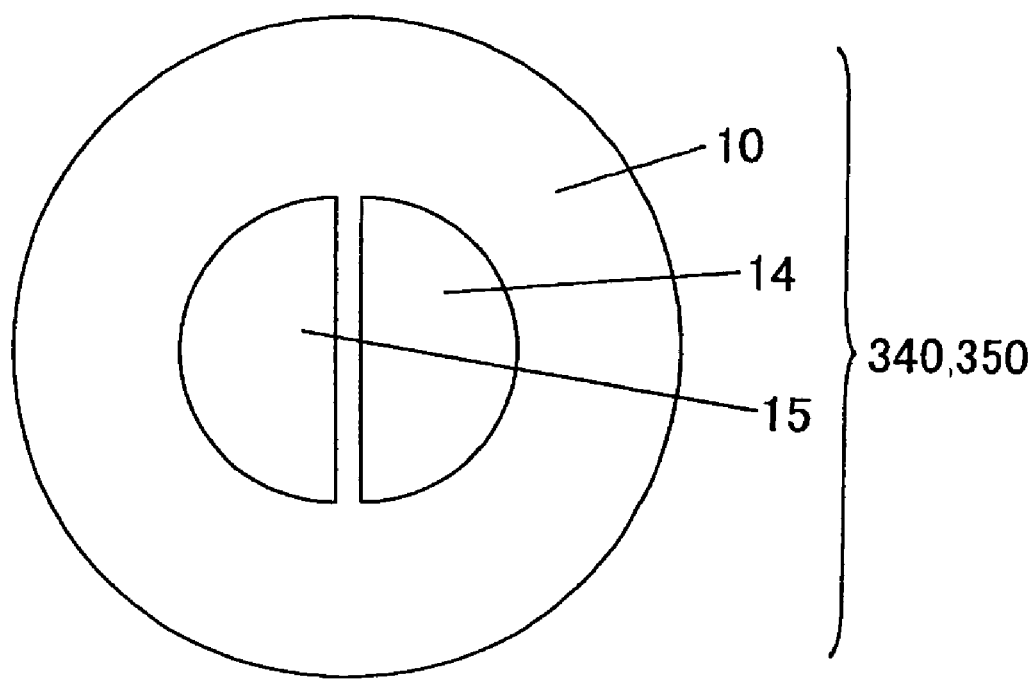
FIG. 8 shows the structure of a focus detection pixel achieved in a variation.

Some of the focus detection pixels 320 and 330 at the image sensor shown in FIG. 2 may be replaced with focus detection pixels 340 and 350 structured as shown in FIG. 8. The structure shown in FIG. 8, adopted in the focus detection pixels 340 and 350, is similar to that of the focus detection pixels shown in FIG. 7 except that the pair of photoelectric conversion units 14 and 15 in FIG. 8 are smaller than the photoelectric conversion units 12 and 13. A focus detection pixel 350 assumes a structure achieved by rotating a focus detection pixel 340 by 90°.

Figure 22:
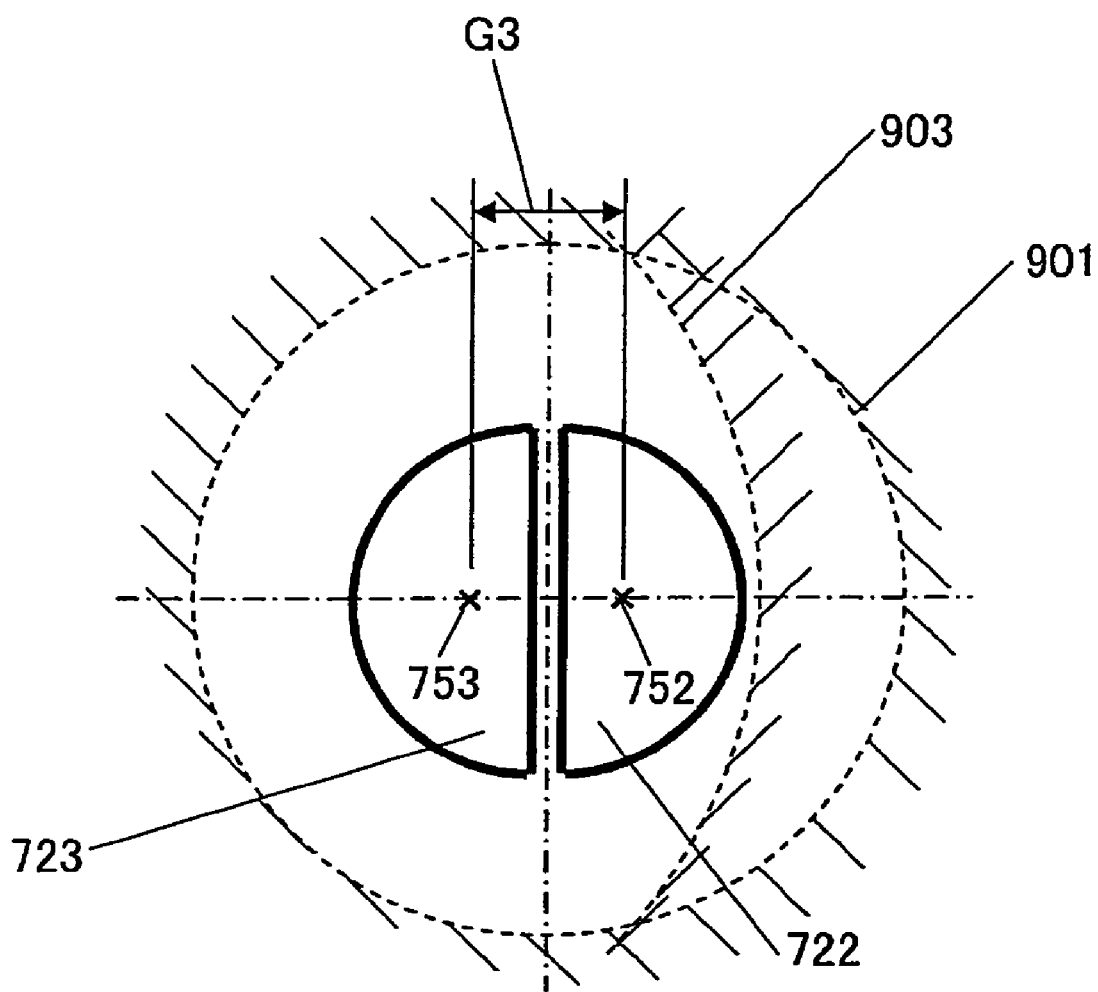
FIG. 22 is a front view of the range-finding pupils on the exit pupil plane of a focus detection pixel.

FIG. 22 is a front view of the rangefinding pupils at the exit pupil with regard to a focus detection pixel assuming the structure shown in FIG. 8, illustrating how vignetting may occur at a rangefinding pupil when the focus detection pixel 340 assumes a position set apart from the image plane center in FIG. 2 along the horizontal direction. The circle circumscribing the rangefinding pupils 722 and 723 formed by projecting the pair of photoelectric conversion units at a focus detection pixel 340 onto the exit pupil 90 via the micro-lens defines a specific aperture F value in case of viewing from an image forming plane (the rangefinding pupil P value, equivalent to F 5.6 in this example) in the figure. An area 901 indicated by the dotted line corresponds to an aperture value (e.g. F2) greater than the aperture value F 2.8, and contains therein the rangefinding pupils 722 and 723. The distance between gravitational centers 752 and 753 of light fluxes (focus detection light fluxes) passing through the rangefinding pupils 722 and 723 measured along the direction in which the rangefinding pupils 722 and 723 are set side by side (the left/right direction in the figure), is G3.

If a focus detection light flux has vignetting as shown in FIG. 14, the opening of the opening restricting element becomes offset relative to the rangefinding pupil along the horizontal direction to overlap the rangefinding pupil (an area 903 is part of the opening restriction). Even in this state, the rangefinding pupils 722 and 723, which are fairly small in size, are not readily influenced by vignetting with the area 903, which makes it easier to sustain the desired level of focus detection performance in the middle area 108 in FIG. 2. Accordingly, a high level of focus detection performance over the middle area can be assured by forming the focus detection areas 122 and 142 with focus detection pixels 340 and focus detection areas 162 and 182 with focus detection pixels 350 in FIG. 2.

Figure 32:
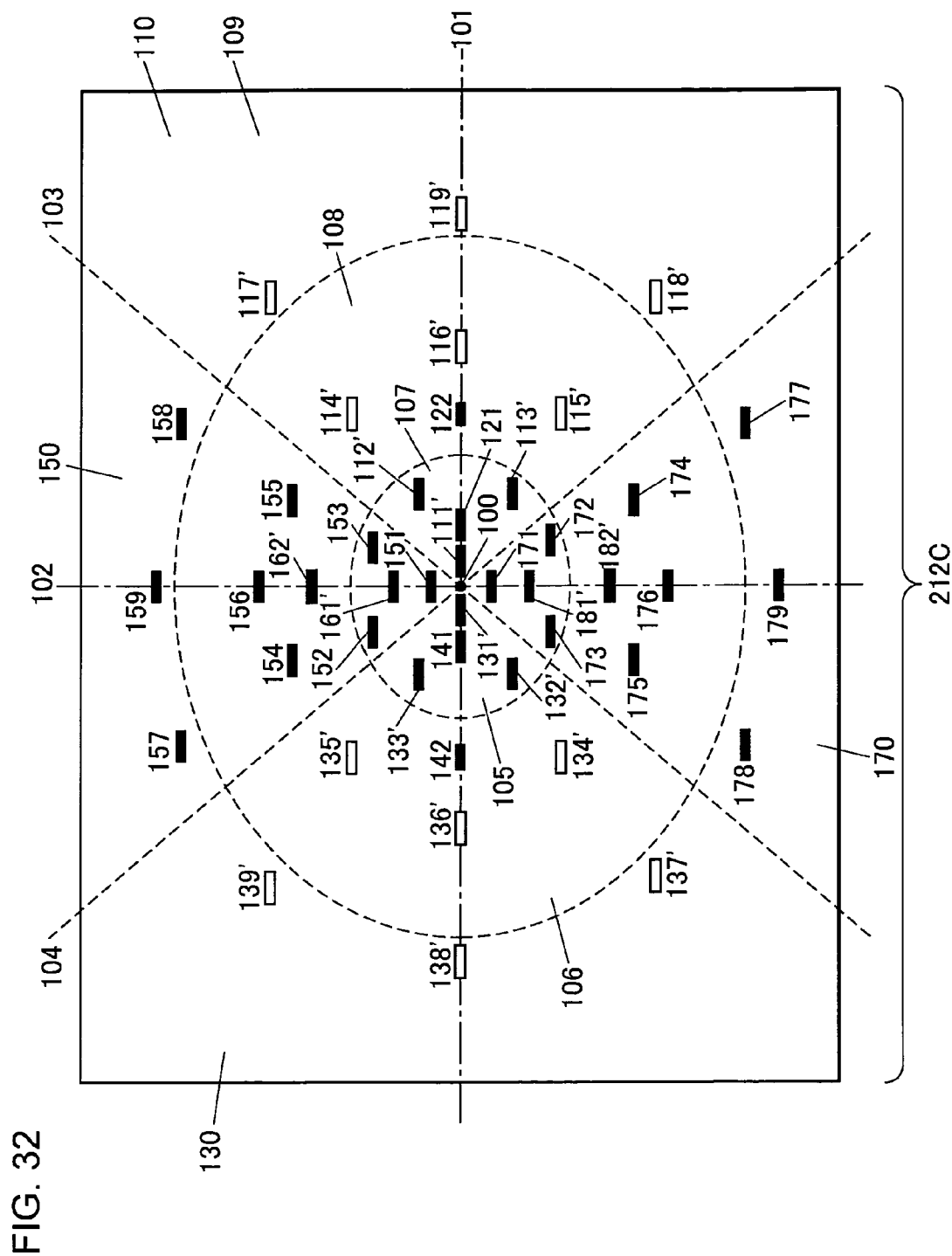
FIG. 32 is a plan view of an image sensor achieved in a variation.

FIG. 32 is a plan view of an image sensor 212C achieved by adopting this variation. The longer side of a rectangle indicates the direction along which focus detection pixels are disposed, with a filled rectangle indicating a focus detection area formed by using focus detection pixels 320 shown in FIGS. 4 and 7 and an unfilled rectangle indicating a focus detection area formed by using focus detection pixels 340 shown in FIG. 8 assuming a smaller size than the focus detection pixels 320 in FIG. 4.

In the area 107 near the image plane center on the inside of an ellipse 105 containing the image plane center 100 within the region 110 ranging along the direction in which focus detection pixels are disposed in the variation shown in FIG. 32, only focus detection areas each indicated by a filled rectangle and constituted with focus detection pixels 320 are disposed. In the middle area 108 outside of the ellipse 105 and inside the ellipse 106, a focus detection area indicated by a filled rectangle and constituted with focus detection pixels 320 is disposed at a position closer to the image plane center but focus detection pixels each indicated by an unfilled rectangle and constituted with focus detection pixels 340 are disposed further away from the center. In the peripheral area 109 of the image plane outside the ellipse 106, focus detection areas each indicated by an unfilled rectangle and constituted with focus detection pixels 340 alone are disposed.

As described above, focus detection pixels with the photoelectric conversion units thereof assuming a smaller size are disposed further away from the image plane center along the direction in which the focus detection pixels are arrayed, so as to minimize the extent to which the focus detection accuracy is compromised due to vignetting. A similar principle applies in the region 130 ranging along the direction in which the focus detection pixels are arrayed. It is to be noted that, as explained earlier, in the regions 150 and 170 ranging along the direction perpendicular to the focus detection pixel arraying direction, the focus detection accuracy is not affected by manifestation of vignetting even if focus detection areas each indicated by a filled rectangle and constituted with focus detection pixels 320 equipped with regular-size photoelectric conversion units are disposed at positions further away from the image plane center (refer to the explanation provided earlier). For this reason, regular focus detection pixels 320 are disposed over the entire regions 150 and 170.

Variation 3

Figure 23:
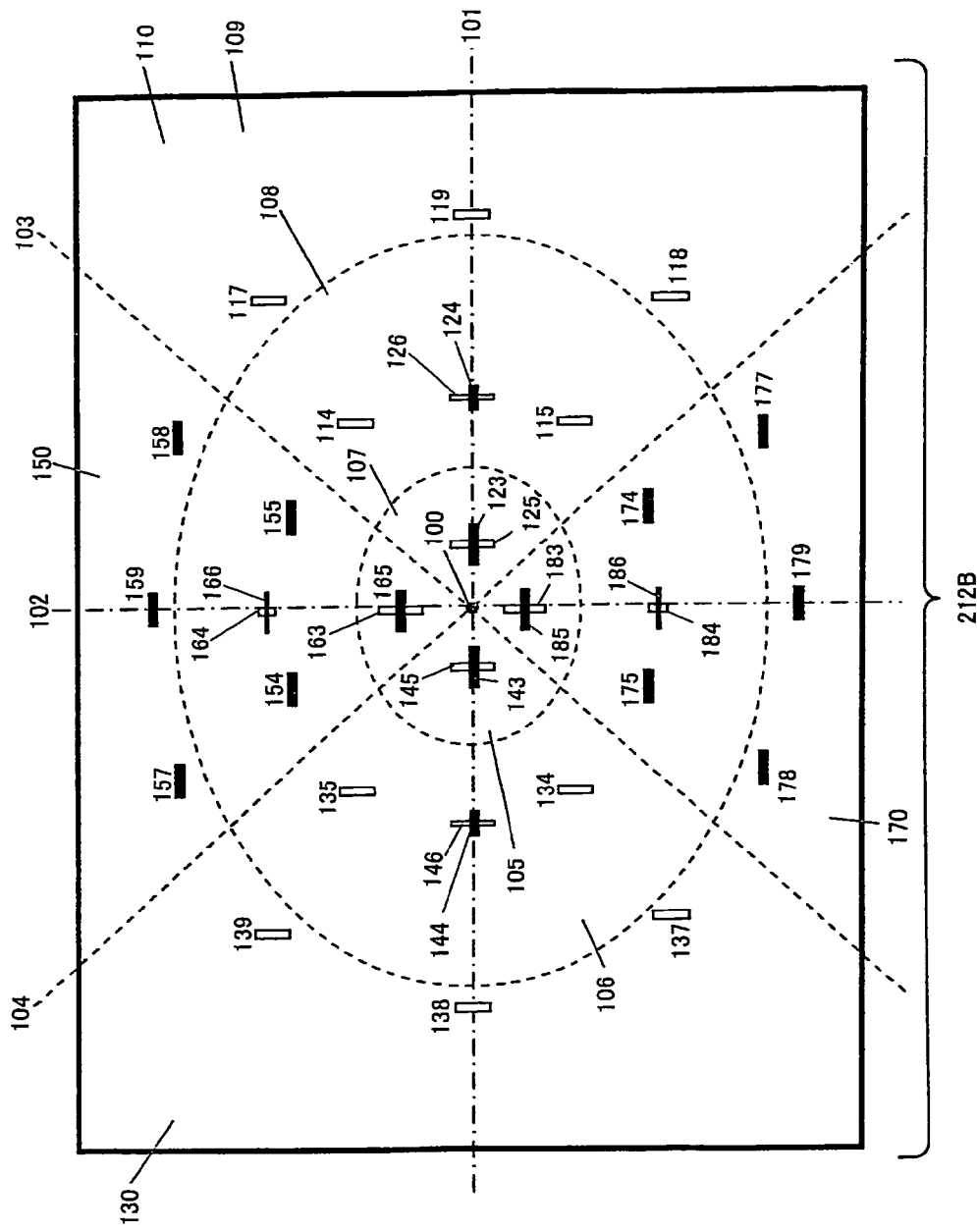
FIG. 23 is a plan view of an image sensor achieved in a variation.

FIG. 23 is a plan view of an image sensor 212B achieved in a variation. At the image sensor 212 in FIG. 2, focus detection areas each formed by arraying focus detection pixels along the horizontal direction and focus detection areas each formed by arraying focus detection pixels along the vertical direction are set at separate positions. At the image sensor 212B achieved in the variation shown in FIG. 23, a focus detection area formed by arraying focus detection pixels along the horizontal direction and a focus detection area formed by arraying focus detection pixels along the vertical direction are set at a given position so as to intersect each other. The following explanation focuses on the difference from the structure in FIG. 2 and does not cover structural elements similar to those shown in FIG. 2.

In the region 110 located to the right relative to the image plane center 100 along the horizontal direction, a focus detection area 125 formed by arraying focus detection pixels along the vertical direction and a focus detection area 123 formed by arraying focus detection pixels along the horizontal direction are set so as to intersect each other in the image plane center area 107. In addition, a focus detection area 126 formed by arraying focus detection pixels along the vertical direction and a focus detection area 124 formed by arraying focus detection pixels along the horizontal direction are set so as to intersect each other in the middle area 108. In the region 130 located to the left relative to the image plane center 100 along the horizontal direction, a focus detection area 145 formed by arraying focus detection pixels along the vertical direction and a focus detection area 143 formed by arraying focus detection pixels along the horizontal direction are set so as to intersect each other in the image plane center area 107. Whereas a focus detection area 146 formed by arraying focus detection pixels along the vertical direction and a focus detection area 144 formed by arraying focus detection pixels along the horizontal direction are set so as to intersect each other in the middle area 108.

In the region 150 located on the upper side relative to the image plane center 100 along the vertical direction, a focus detection area 163 formed by arraying focus detection pixels along the vertical direction and a focus detection area 165 formed by arraying focus detection pixels along the horizontal direction are set so as to intersect each other in the image plane center area 108, whereas a focus detection area 164 formed by arraying focus detection pixels along the vertical direction and a focus detection area 166 formed by arraying focus detection pixels along the horizontal direction are set so as to intersect each other in the middle area 108. In the region 170 located on the lower side relative to the image plane center 100 along the vertical direction, a focus detection area 183 formed by arraying focus detection pixels along the vertical direction and a focus detection area 185 formed by arraying focus detection pixels along the horizontal direction are set so as to intersect each other in the image plane center area 107, whereas a focus detection area 184 formed by arraying focus detection pixels along the vertical direction and a focus detection area 186 formed by arraying focus detection pixels along the horizontal direction are set so as to intersect each other in the vicinity of the middle area 108.

Figure 24:
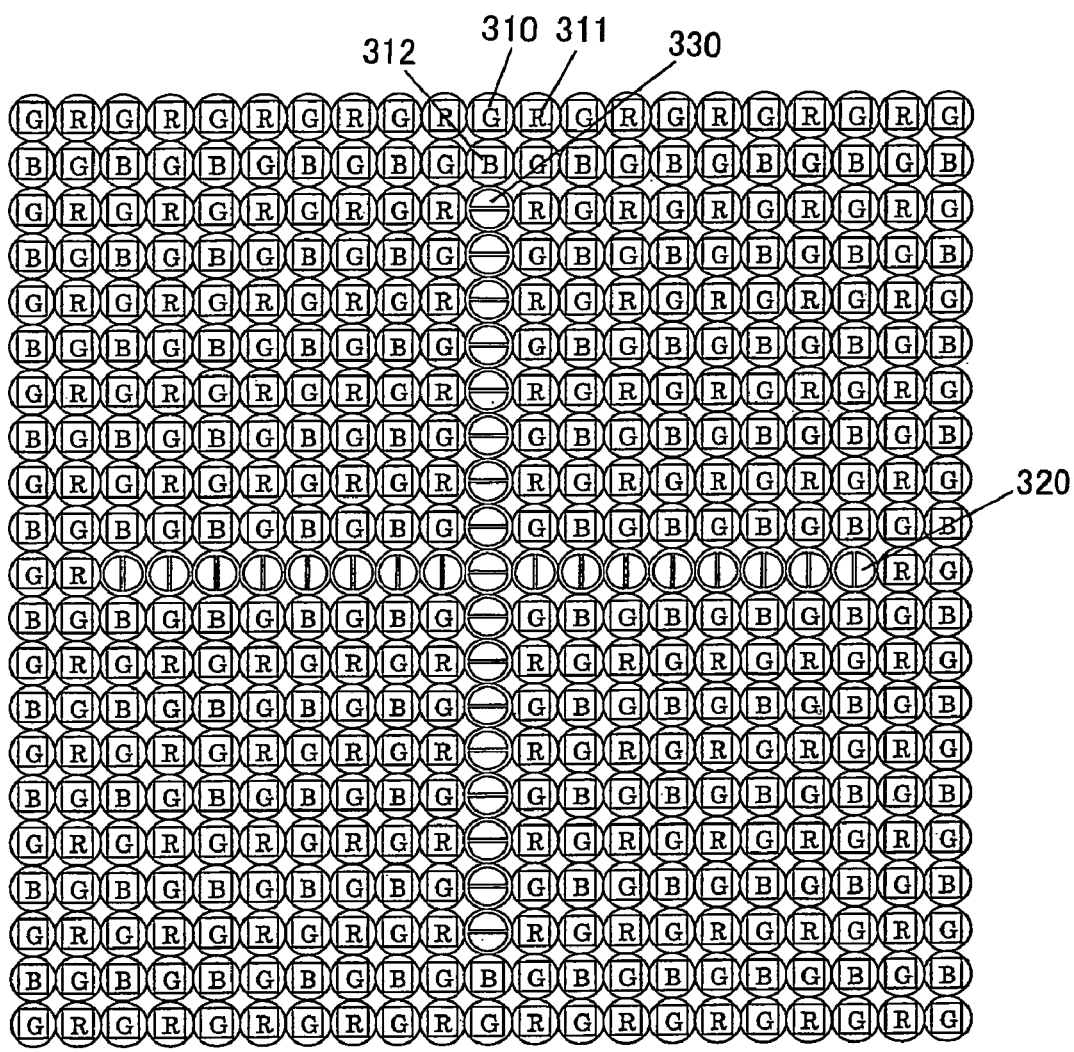
FIG. 24 is an enlarged view of an area where the focus detection area 123 and the focus detection area 125 intersect in FIG. 23.

FIG. 24 provides an enlarged view of an area over which the focus detection area 123 and a focus detection area 125 intersect each other, as shown in FIG. 23. The focus detection area 123 is formed by arraying focus detection pixels 320, whereas the focus detection area 125 is formed by arraying focus detection pixels 330. It is to be noted that a focus detection pixel 330 is disposed at the intersecting position. The arrangement constituted with the focus detection pixels 320 and the focus detection pixels 330 is surrounded by imaging pixels. It is to be noted that similar structural arrangements are assumed in the area over which the focus detection area 124 and the focus detection area 126 intersect, the area over which the focus detection area 143 and the focus detection area 145 intersect and the area over which the focus detection area 144 and the focus detection area 146 intersect.

In addition, while similar structural arrangements are assumed in the area over which the focus detection area 163 and the focus detection area 165 intersect, the area over which the focus detection area 164 and a focus detection area 166 intersect, the area over which the focus detection area 183 and the focus detection area 185 intersect and the area over which the focus detection area 184 and the focus detection area 184, a focus detection pixels 320 is disposed at the intersecting position in each of these areas.

The structure described above enables focus detection to be executed along the horizontal direction and the vertical direction at a single position assumed on the image plane by distributing focus detection pixels 320 and focus detection pixels 330 for maximum focus detection performance and maximum efficiency while keeping down the number of focus detection pixels.

The structure of the image sensor 212B in FIG. 23 and, in particular, the positional arrangement of the focus detection areas characterizing the image sensor, is explained. The regions 110 and 130 each contain a plurality of focus detection areas each formed by intersecting a focus detection area constituted with focus detection pixels 320 disposed along the horizontal direction and a focus detection area constituted with focus detection pixels 330 disposed along the vertical direction, as well as a plurality of focus detection areas each formed by simply arraying focus detection pixels 330 along the vertical direction. In addition the regions 150 and 170 each contain a plurality of focus detection areas each formed by intersecting a focus detection area constituted with focus detection pixels 320 disposed along the horizontal direction and a focus detection area constituted with focus detection pixels 330 disposed along the vertical direction, as well as a plurality of focus detection areas each formed by simply arraying focus detection pixels 320 along the horizontal direction. This positional arrangement makes it possible to capture the focus detection target at as many positions on the image plane as possible and, at the same time, since the image contrast can be detected both along the horizontal direction and the vertical direction at a given position at which intersecting focus detection areas meet, the focus detection performance improves.

In addition, in the image plane center area 107 where the focus detection target is likely to be present, only focus detection areas each formed by intersecting a focus detection area constituted with focus detection pixels 320 disposed along the horizontal direction and a focus detection area constituted with focus detection pixels 330 disposed along the vertical direction, with intersect each other, are set. As a result, the focus detection performance over the image plane center area is improved.

Over the middle area 108, which is more readily affected by manifestation of vignetting, focus detection areas, each formed by intersecting a focus detection area constituted of the focus detection pixels 320 disposed along the horizontal direction and a focus detection area constituted of the focus detection pixels 330 disposed along the vertical direction with each other and focus detection areas each constituted with a single focus detection area and less readily affected by vignetting (focus detection areas each formed by disposing focus detection pixels 330 along the vertical direction are set in the regions 110 and 130, whereas focus detection areas each formed by disposing focus detection pixels 320 along the horizontal direction are set in the regions 150 and 170) are set so as to sustain the desired level of focus detection performance.

Over the peripheral area 109 greatly affected by vignetting, only focus detection areas, each constituted with a single focus detection area less readily affected by vignetting (focus detection areas each constituted by disposing focus detection pixels 330 along the vertical direction are set in the regions 110 and 130, whereas focus detection areas each formed by disposing focus detection pixels 320 along the horizontal direction are set in the regions 150 and 170) are set so as to sustain the desired level of focus detection performance.

Over the regions 110 and 130 separated from each other along the horizontal direction on the two sides of the image plane center, focus detection pixels 330 are disposed in a greater number than focus detection pixels 320, whereas over the regions 150 and 170 separated from each other along the vertical direction on the two sides of the image plane center, focus detection pixels 320 are disposed in a greater number than focus detection pixels 330, so as to distribute the focus detection pixels 320 and the focus detection pixels 330 for the maximum focus detection performance including a satisfactory level of performance in the event of vignetting and the maximum efficiency, while keeping down the overall number of focus detection pixels.

Over the regions 110 and 130 separated from each other along the horizontal direction on the two sides of the image plane center, focus detection areas each formed by disposing focus detection pixels 330 along the vertical direction are set in a greater number than focus detection areas each formed by disposing focus detection pixels 320 along the horizontal direction, whereas focus detection areas each formed by disposing focus detection pixels 320 along the horizontal direction are set in a greater number than focus detection areas each formed by disposing focus detection pixels 330 along the vertical direction over the regions 150 and 170 separated from each other along the vertical direction relative to the image plane center, so as to distribute the focus detection pixels 320 and the focus detection pixels 330 for maximum focus detection performance including a satisfactory level of performance in the event of vignetting and maximum efficiency while keeping down the overall number of focus detection pixels.

In the area around the image plane center, manifestation of vignetting does not greatly affect the focus detection performance whereas an area further away from the image plane center is more affected by vignetting. Accordingly, in the regions 110 and 130 located to the left and the right along the horizontal direction relative to the image plane center, focus detection areas each formed by disposing along the horizontal direction focus detection pixels 320 more likely to be affected by vignetting are paired up (made to intersect) with focus detection areas each formed by disposing focus detection pixels 330 less likely to be affected by vignetting along the vertical direction. Also, in the regions 150 and 170 located on the upper side and the lower side along the vertical direction relative to the image plane center, focus detection areas each formed by disposing along the vertical direction focus detection pixels 330 more likely to be affected by vignetting are paired up (made to intersect) with focus detection areas each formed by disposing focus detection pixels 320 less likely to be affected by vignetting along the horizontal direction. Consequently, the desired level of focus detection performance is maintained while minimizing the overall number of focus detection pixels.

Variation 4

Figure 25:
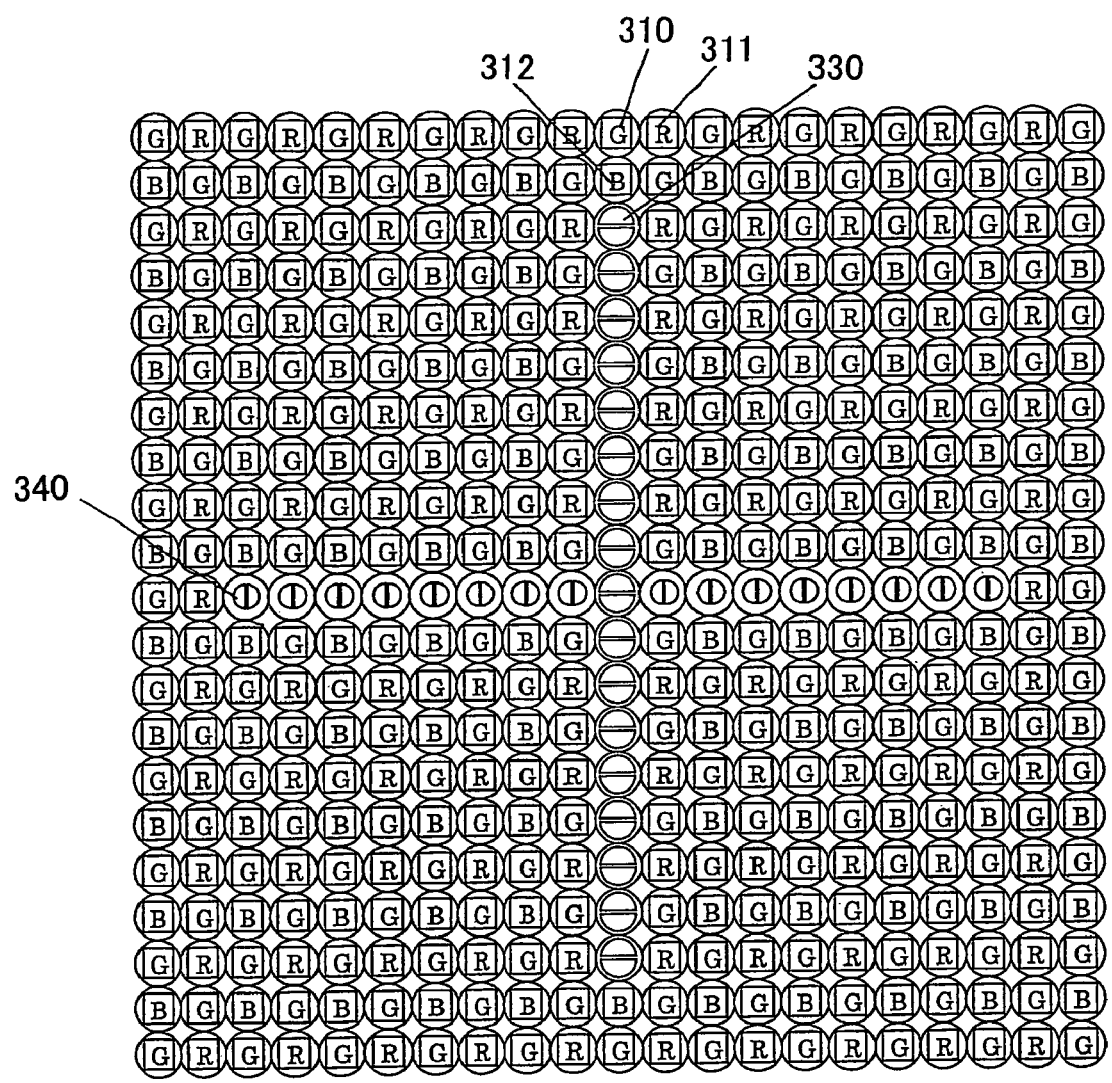
FIG. 25 presents an example achieved by replacing the focus detection pixel arrangement in FIG. 24 with an arrangement of focus detection pixels less likely to be affected by vignetting effect.
Figure 26:
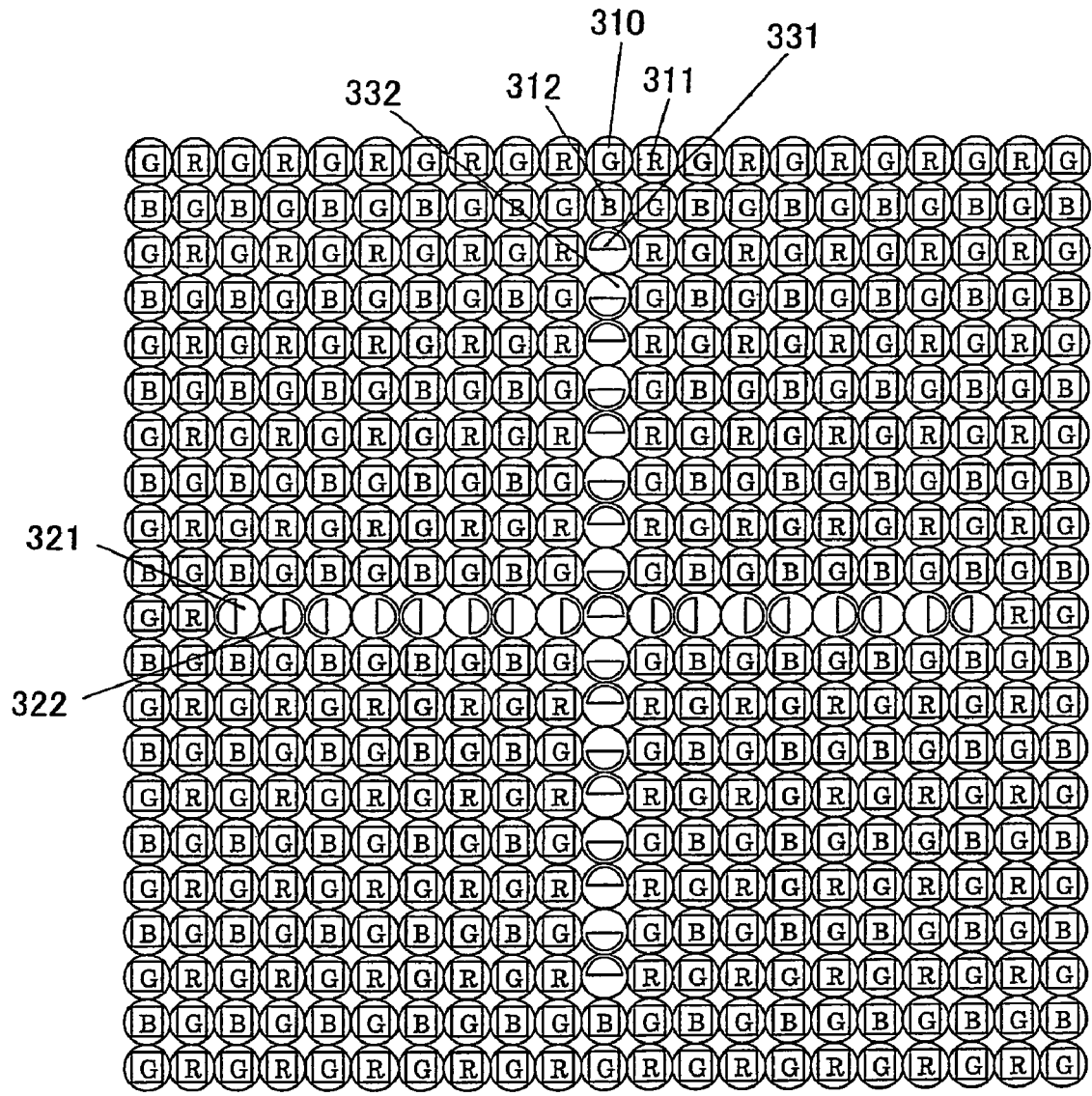
FIG. 26 presents an example achieved by replacing the arrangement of focus detection pixels 320 and the arrangement of focus detection pixels 330 in FIG. 24 respectively with an arrangement of pairs of focus detection pixels, with each pair constituted of a focus detection pixel 321 and a focus detection pixel 322 each equipped with a single photoelectric conversion unit and with an constituted with a focus of pairs of focus detection pixels, with each pair constituted of a focus detection pixel 331 and a focus detection pixel 332 each equipped with a single photoelectric conversion unit.

FIG. 25 presents an example achieved by replacing the arrangement of the focus detection pixels 320 in FIG. 24 with an arrangement of the focus detection pixels 340 shown in FIG. 8, which are not as readily affected by vignetting as the focus detection pixels 320. In addition, FIG. 26 presents an example achieved by replacing the arrangement of focus detection pixels 320 and the arrangement of the focus detection pixels 330 in FIG. 24 respectively with an arrangement made up with focus detection pixel pairs each constituted of a focus detection pixel 321 and a focus detection pixel 322 each equipped with a single photoelectric conversion unit and with an arrangement made up with focus detection pixel pairs each constituted of a focus detection pixel 331 and a focus detection pixel 332 each equipped with a single photoelectric conversion unit.

Other Variations

While the imaging pixels in the image sensors shown in FIGS. 2 and 23 are equipped with color filters assuming a Bayer array, the color filters adopting a structure or an arrangement other than those shown in the figures may be used in conjunction with the present invention. For instance, an image sensor that includes complementary color filters, i.e., G (green) filters, Ye (yellow) filters, Mg (magenta) filters and Cy (cyan) filters, may be used.

While the focus detection pixels in the image sensors shown in FIGS. 2 and 23 are not equipped with color filters, the present invention may be adopted in conjunction with focus detection pixels equipped with color filters, the color of which matches one of the colors of the color filters at the imaging pixels (e.g., green filters). In this case, the image data generated at the focus detection pixels can be utilized in the image data interpolation and, as a result, the image quality is improved.

While FIGS. 2 and 23 each show an image sensor at which focus detection pixels are disposed successively, imaging pixels may be disposed between focus detection pixels so as to assure high image quality. It is to be noted that the present invention may be adopted by arraying focus detection pixels at an image sensor in patterns other than the array patterns shown in FIGS. 2 and 23, as long as the object of the present invention is accurately reflected.

While focus detection pixels are disposed so as to strike an optimal balance between image quality requirements and focus detection performance requirements in each of the four regions located on the upper side, the lower side, the left side and the right side of the image plane divided by the straight lines 102 and 103 passing through the image plane center at 45° angles relative to the horizontal line 101 and the vertical line 102 at the image sensor shown in FIGS. 2 and 23, these array patterns are designed in conjunction with imaging pixels and focus detection pixels assuming a square array and the present invention may be adopted in conjunction with imaging pixels and focus detection pixels assuming an array pattern other than the square array as well.

Figure 27:
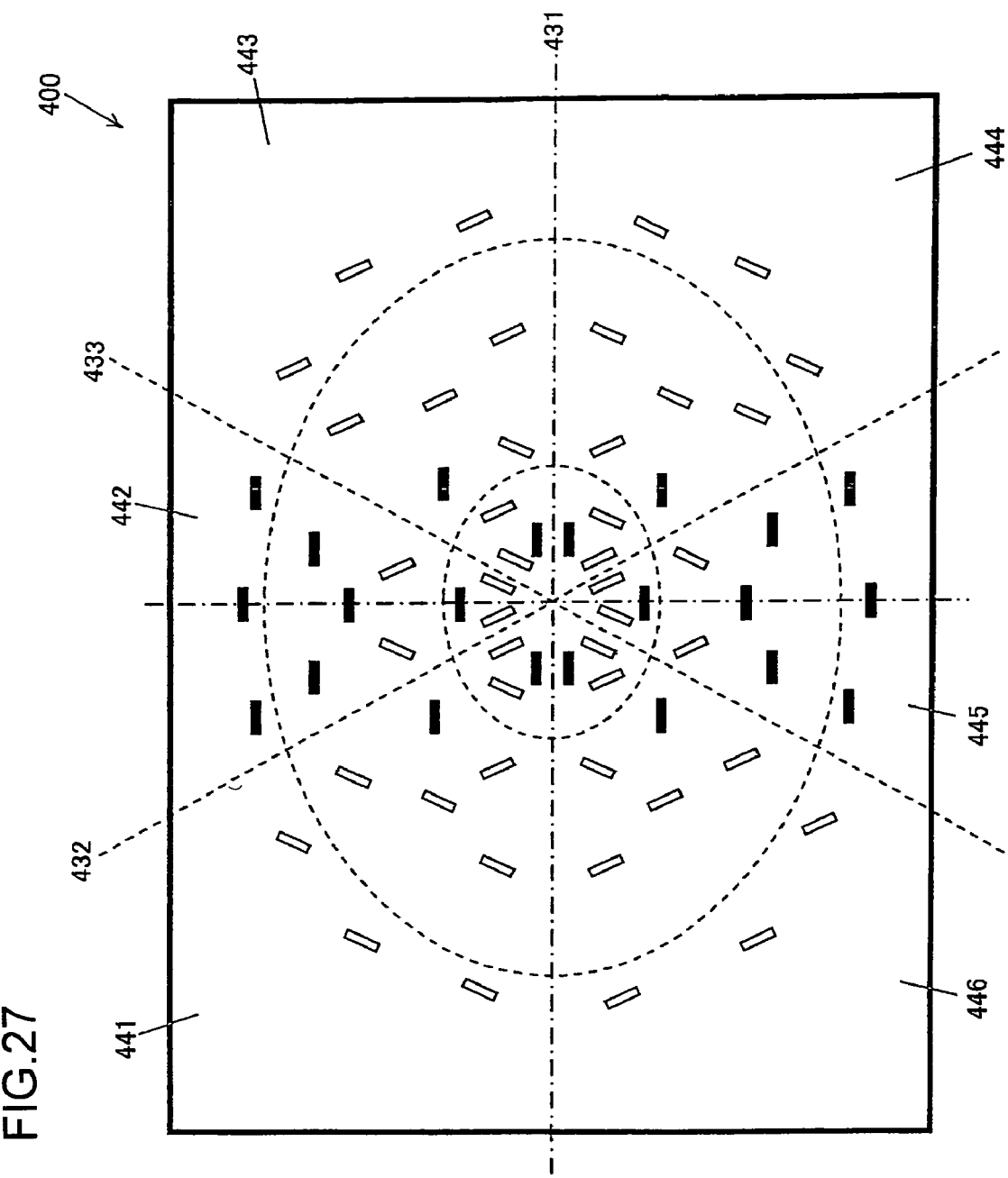
FIG. 27 is a plan view of an image sensor that includes imaging pixels and focus detection pixels disposed in a high-density hexagonal array pattern.
Figure 29:
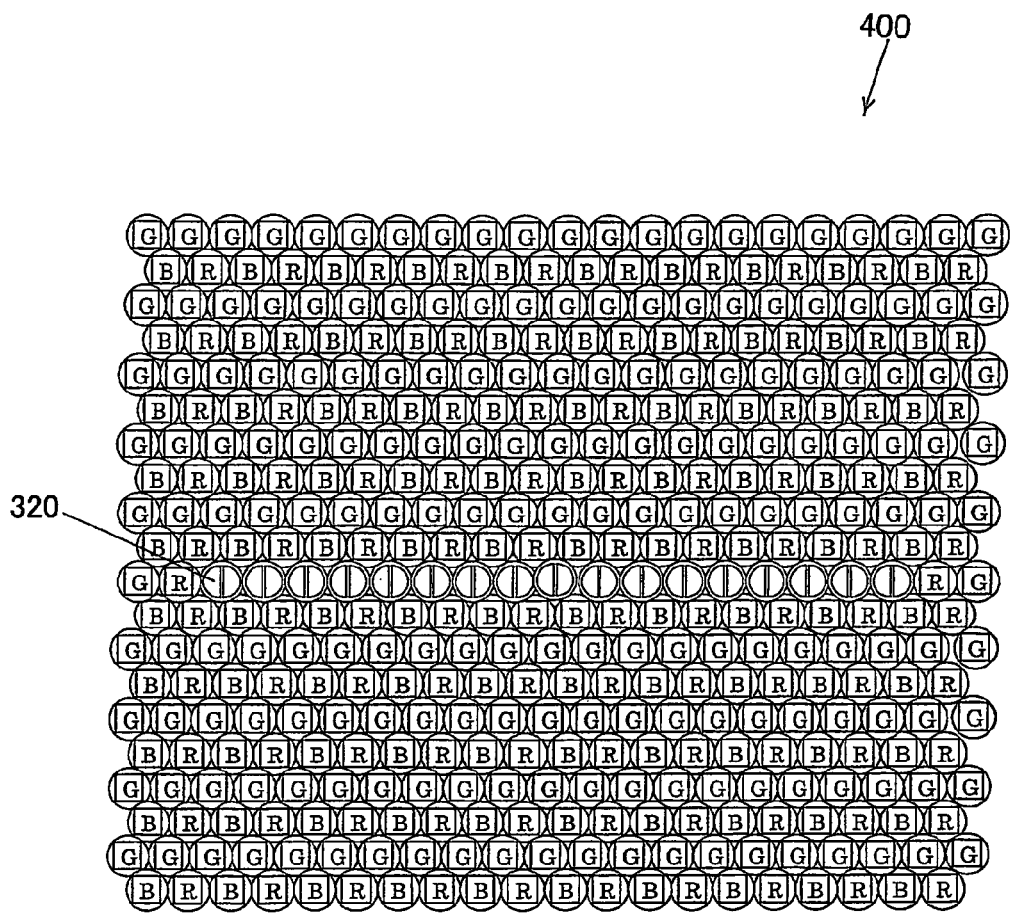
FIG. 29 is an enlarged view of an area over which focus detection pixels are arrayed at the image sensor in FIG. 27.
Figure 30:
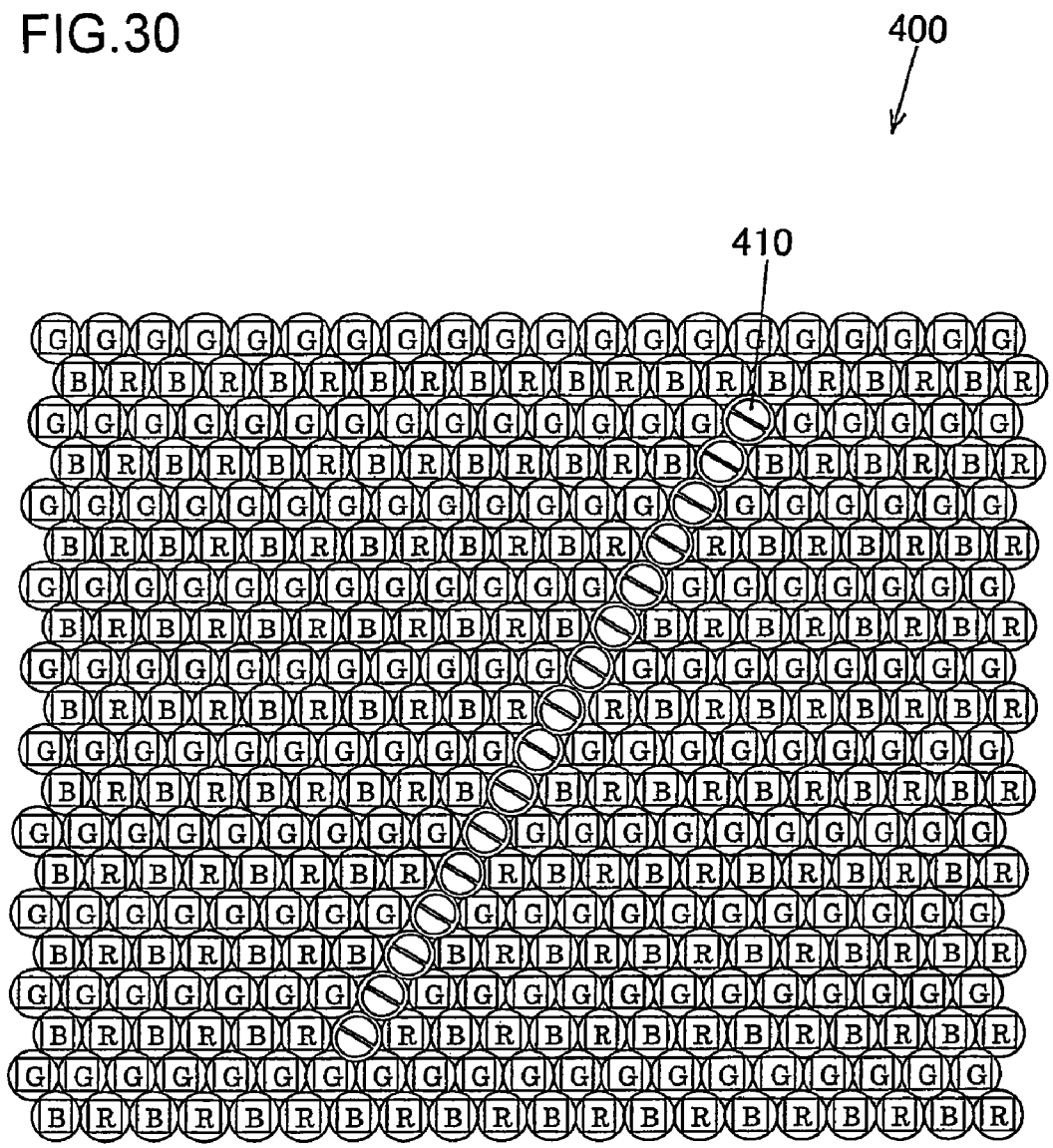
FIG. 30 is an enlarged view of another area over which focus detection pixels are arrayed at the image sensor in FIG. 27.
Figure 31:
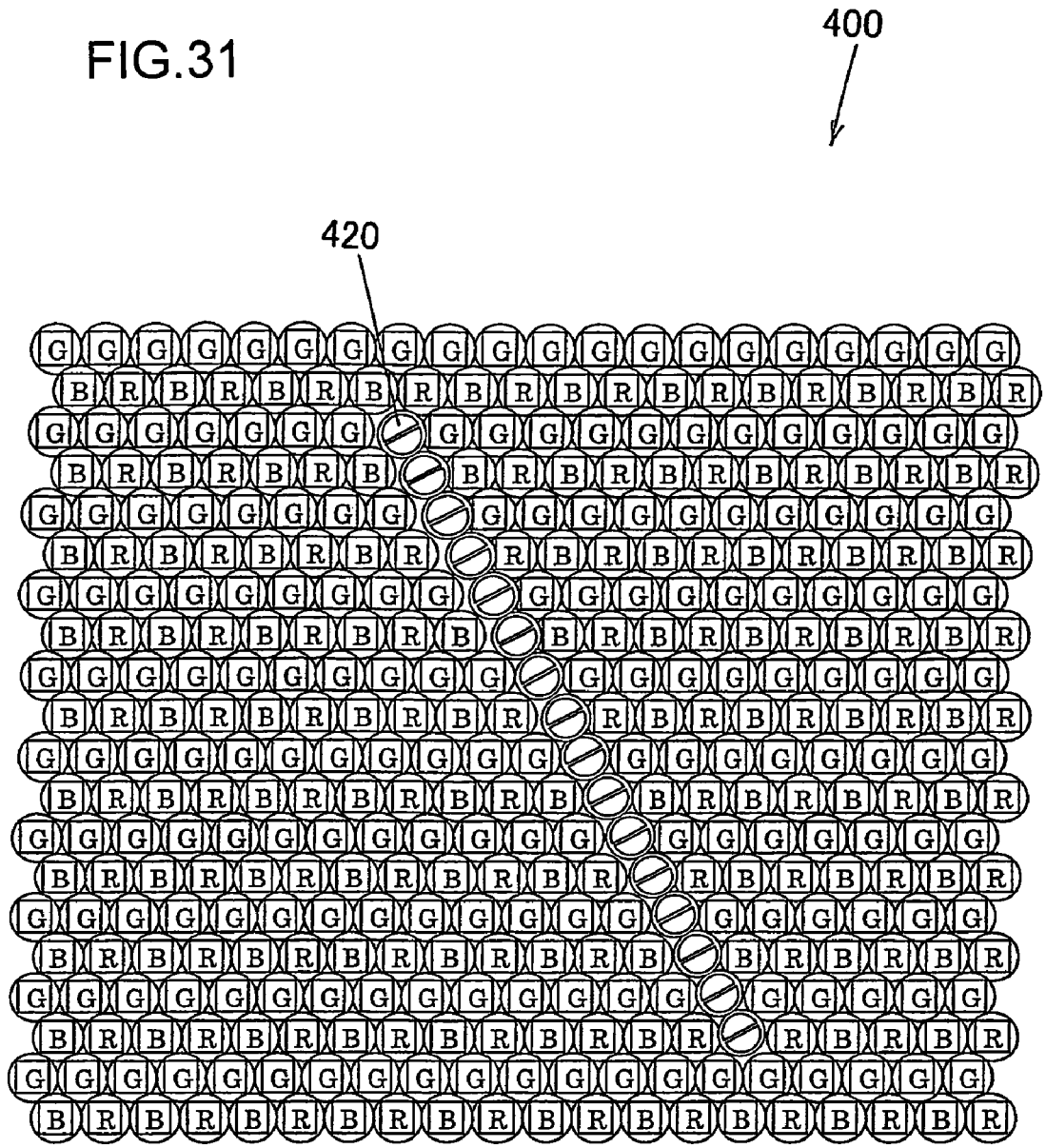
FIG. 31 is an enlarged view of yet another area over which focus detection pixels are arrayed at the image sensor in FIG. 27.

For instance, the present invention may be adopted in conjunction with imaging pixels and focus detection pixels disposed in a dense hexagonal array pattern (honeycomb array) instead of the square array. FIG. 27 is a plan view of an image sensor 400 achieved by disposing imaging pixels and focus detection pixels on a plane in a dense hexagonal array pattern, FIG. 28 provides an enlarged view of an area where imaging pixels 310~312 (see FIG. 6) are arrayed at the image sensor 400, FIG. 29 provides an enlarged view of an area where focus detection pixels 320 (see FIG. 7) are arrayed at the image sensor 400, FIG. 30 provides an enlarged view of an area where focus detection pixels 410 (see FIG. 7) are arrayed at the image sensor 400, and FIG. 31 provides an enlarged view of an area where focus detection pixels 420 (see FIG. 7) are arrayed at the image sensor 400.

Figure 28:
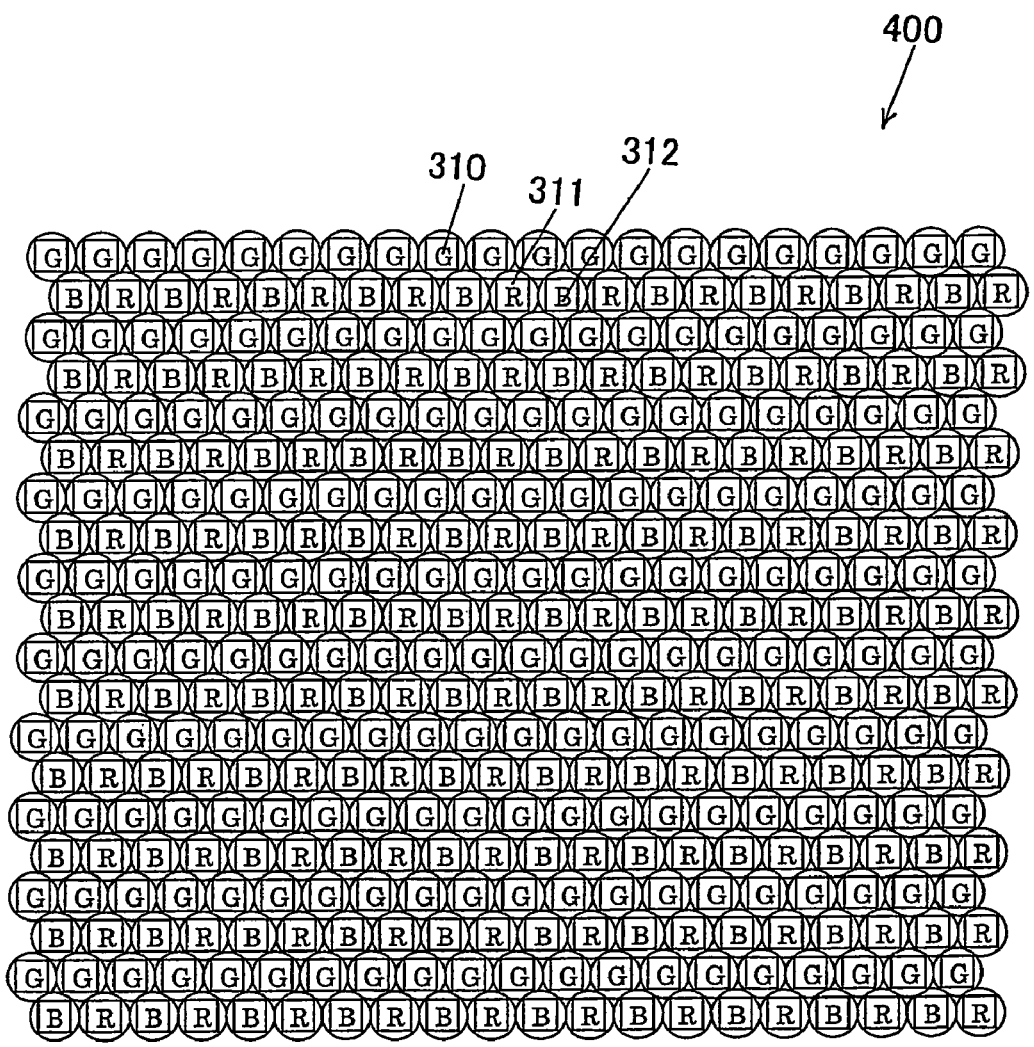
FIG. 28 is an enlarged view of an area over which imaging pixels are arrayed at the image sensor in FIG. 27.

This image sensor 400 is achieved by disposing the imaging pixels 310~312 in a dense hexagonal array (honeycomb array) as shown in FIG. 28, with the focus detection pixels 320, 410 and 420 replacing some of the imaging pixels 310~312 in the array. FIG. 29 shows a plurality of focus detection pixels 320 disposed along the horizontal direction (the left/right direction in the figure) and forming a horizontal focus detection area. FIG. 30 shows a plurality of focus detection pixels 410 disposed along a right-upward diagonal direction, forming a right-upward diagonal focus detection area. It is to be noted that the focus detection pixel 410 achieved by rotating a focus-detection pixel 320 along the counter-clockwise direction by 60°. FIG. 31 shows a plurality of focus detection pixels 420 disposed along a left-upward diagonal direction, forming a left-upward diagonal focus detection area. It is to be noted that a focus detection pixel 420 is achieved by rotating a focus detection pixel 320 along the clockwise direction by 60°.

As shown in FIG. 27, in a dense hexagonal pixel array, the pixels are densely disposed along three directions (extending with a 60° angle relative to one another) and thus, the image plane is divided into six regions 441 through 446 by three straight lines (extending with a 60° angle relative to one another) 431, 432 and 433 passing through the image plane center with the pixels disposed between them. In other words, the focus detection pixels 320, 410 and 420 can be disposed along the three directions by ensuring the optimal balance between focus detection performance and image quality in each region.

In addition, the focus detection pixels in a square pixel array may be constituted with pixels set along the diagonal 45° directions as well.

It is to be noted that the present invention may be adopted in an image sensor that includes focus detection pixels used to execute focus detection through another split pupil phase difference detection method instead of an image sensor that includes focus detection pixels used to execute focus detection through the split pupil phase difference detection methods in conjunction with micro lenses. For instance, it may be adopted in an image sensor that includes focus detection pixels used to execute focus detection through a split pupil phase detection method by using polarized light.

Instead of adopting the present invention in an imaging device, e.g., a digital still camera or a film-type still camera constituted with an interchangeable lens and a camera body, the present invention may be adopted in a digital still camera or a film still camera with an integrated lens. It may also be adopted in a compact camera module built into a portable telephone or the like, a surveillance camera or the like, as well. The present invention may be further adopted in a focus detection device installed in a device other than a camera, a rangefinding device or a stereo rangefinding device.

Figure 33:
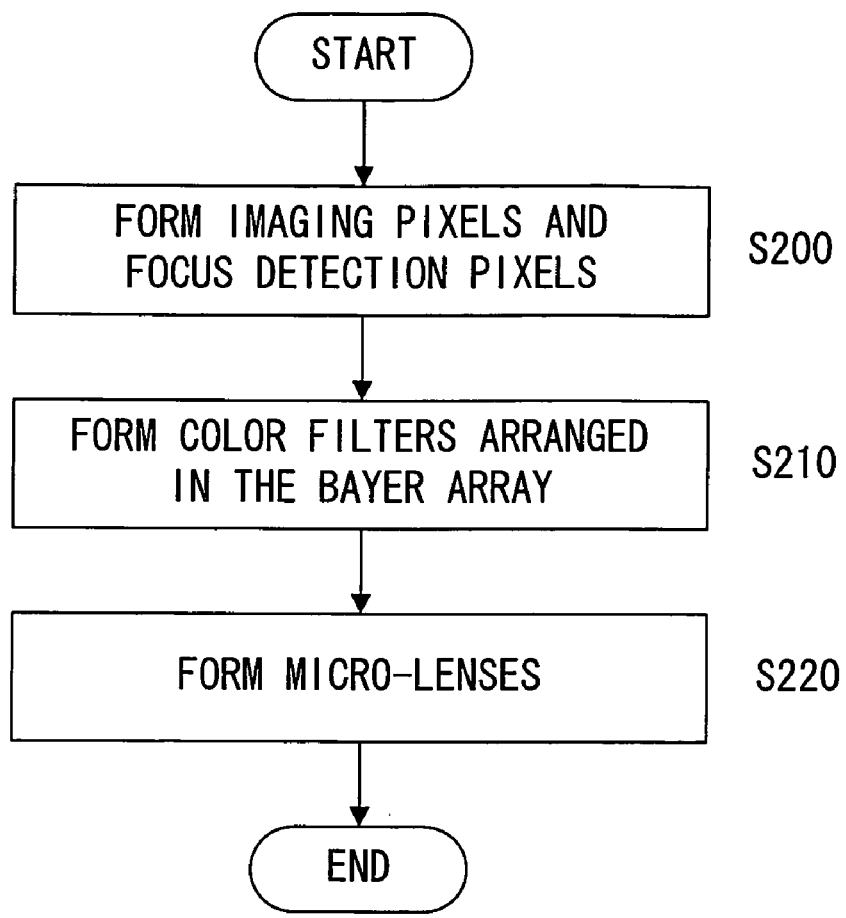
FIG. 33 shows a flowchart that illustrates a process for manufacturing the image sensor explained in the above embodiment.

FIG. 33 shows a flowchart that illustrates a process for manufacturing the image sensor 212 explained in the above embodiment. In step S200, the imaging pixels 310~312, and the focus detection pixels 320 and 330 are formed on a semiconductor substrate through lithography technology by using masks for forming the image sensor 212 corresponding to the FIG. 2.

In step S210, color filters arranged in the Bayer array shown in FIG. 3 are formed through lithography technology. As explained before, color filters are not formed on the focus detection pixels 320 and 330. In step S220, micro-lenses 10 are formed on the pixels respectively through lithography technology.

Other image sensors according to the variations explained before are also manufactured in the same way as the above. It is to be noted that the process for manufacturing the image sensor 212 is not limited to the process shown in FIG. 33. Other manufacturing processes (manufacturing methods) can be available as far as the image sensors 212 according to FIG. 2 or other image sensors according to variations can be manufactured.

According to the present invention, an improvement in the focus detection performance is achieved while assuring high image quality by satisfying both the imaging function requirements and the focus detection function requirements.

The above described embodiments are examples and various modifications can be made without departing from the scope of the invention.

LEGEND

10: micro-lens
11: photoelectric conversion unit
12: photoelectric conversion unit
13: photoelectric conversion unit
14: photoelectric conversion unit
15: photoelectric conversion unit
201: digital still camera
202: interchangeable lens
203: camera body
204: mount unit
206: lens drive control device
208: zooming lens
209: lens
210: focusing lens
211: aperture
212: image sensor
213: electrical contact point portion
214: body drive control device
215: liquid crystal display element drive circuit
216: liquid crystal display element
217: eyepiece lens
219: memory card
310: green pixel
311: red pixel
312: blue pixel
320: focus detection pixel
321: focus detection pixel
322: focus detection pixel
330: focus detection pixel
331: focus detection pixel
332: focus detection pixel
340: focus detection pixel
350: focus detection pixel
400: image sensor
410: focus detection pixel
420: focus detection pixel
722: rangefinding pupil
723: rangefinding pupil
752: gravitational center
753: gravitational center
822: rangefinding pupil
833: rangefinding pupil
852: gravitational center
853: gravitational center
901: area
903: area
922: rangefinding pupil
933: rangefinding pupil
952: gravitational center
953: gravitational center
972: gravitational center

What is claimed is:

1. An image sensor that is to be placed at an imaging plane of an optical system and is equipped with imaging pixels disposed in a two-dimensional array, which converts an image formed through the optical system to an electrical signal, comprising:
    image-capturing pixels that are disposed in the array of the imaging pixels and are used for functions including displaying an image;
    first focus detection pixel areas each formed by disposing in the array of the imaging pixels a plurality of first pixels adopting a split pupil method and used for focus detection; and
    second focus detection pixel areas each formed by disposing in the array of the imaging pixels a plurality of second pixels adopting a split pupil method different from the split pupil method adopted in the first pixels and used for focus detection, wherein:
    a relationship between a number of the first focus detection pixel areas and a number of the second focus detection pixel areas is determined in correspondence to directions of positions of the first focus detection pixel areas and the second focus detection pixel areas relative to a center of the image sensor.

2. An image sensor according to claim 1, wherein:
    when the image sensor is divided into a first region ranging along a first direction in which the first pixels in each of the first focus detection pixel areas are disposed and a second region ranging along a second direction in which the second pixels in each of the second focus detection pixel areas are disposed, the second focus detection pixel areas are disposed in a greater number than the first focus detection pixel areas in the first region and the first focus detection pixel areas are disposed in a greater number than the second focus detection pixel areas in the second region.

3. An image sensor according to claim 1, wherein:
the relationship between the number of the first focus detection pixel areas and the number of the second focus detection pixel areas is determined in correspondence to a distance from the center of the image sensor.

4. An image sensor according to claim 1, wherein:
the first pixels and the second pixels are disposed respectively along a first direction and a second direction in which pixels are disposed densely in the array of the imaging pixels; and
when the image sensor is divided into a first region ranging along the first direction and a second region ranging along the second direction with borderlines extending along radial directions different from the first direction and the second direction in reference to a position through which an optical axis of the optical system passes, the second focus detection pixel areas are disposed in a greater number than the first focus detection pixel areas in the first region and the first focus detection pixel areas are disposed in a greater number than the second focus detection pixel areas in the second region.

5. An image sensor according to claim 4, wherein:
the borderlines extend at 45° inclinations relative to the first direction and the second direction.

6. An image sensor according to claim 1, wherein:
a photoelectric conversion unit at each of the first pixels in the first focus detection pixel areas has a size different from a size of a photoelectric conversion unit at each of the second pixels in the second focus detection pixel areas.

7. An image sensor according to claim 2, wherein:
photoelectric conversion units at the first pixels in the first focus detection pixel areas disposed in the first region are smaller in size than photoelectric conversion units at the second pixels in the second focus detection pixel areas disposed in the first region.

8. An image sensor according to claim 1, wherein:
the first pixels in the first focus detection pixel areas and the second pixels in the second focus detection pixel areas each include a single photoelectric conversion unit, photoelectric conversion units at first pixels adjacent to each other are paired up and photoelectric conversion units at second pixels adjacent to each other are paired up.

9. An image sensor according to claim 1, wherein:
the first pixels each include a photoelectric conversion unit that receives a light flux having passed through at least one of a pair of areas set side by side along a first direction on an exit pupil of the optical system and the first focus detection pixel areas are each formed by disposing a plurality of the first pixels along a direction corresponding to the first direction;
the second pixels each include a photoelectric conversion unit that receives a light flux having passed through at least one of a pair of areas set side by side along a second direction different from the first direction on the exit pupil of the optical system and the second focus detection pixel areas are each formed by disposing a plurality of the second pixels along a direction corresponding to the second direction; and
when the image sensor is divided into a first region ranging along a direction corresponding to the first direction and a second region ranging along a direction corresponding to the second direction with borderlines extending along radial directions different from the first direction and the second direction in reference to a position through which an optical axis of the optical system passes, the second focus detection pixel areas are disposed in a greater number than the first focus detection pixel areas in the first region and the first focus detection pixel areas are disposed in a greater number than the second focus detection pixel areas in the second region.

10. An image sensor according to claim 4, wherein:
a ratio of the number of the first focus detection pixel areas to the number of the second focus detection pixel areas is gradually reduced further away from the position at which the optical axis passes in the first region and a ratio of the number of the second focus detection pixel areas to the number of the first focus detection pixel areas is gradually reduced further away from the position at which the optical axis passes in the second region.

11. An image sensor according to claim 1, wherein:
at the center of the pixel array in the image sensor, a first focus detection pixel group and a second focus detection pixel group are disposed so as to intersect each other.

12. An image sensor according to claim 2, wherein:
only the second focus detection pixel areas are disposed in the first region over a peripheral area of the pixel array in the image sensor and only the first focus detection pixel areas are disposed in the second region over a peripheral area of the pixel array in the image sensor.

13. An image sensor according to claim 2, wherein:
the first direction and the second direction are directions along which pixels are densely disposed in the pixel array in the image sensor.

14. A focus detection device, comprising:
an image sensor according to claim 1; and
a focus detection unit that detects a state of focus adjustment at the optical system based upon outputs from the first focus detection pixel areas and the second focus detection pixel areas.

15. An imaging device, comprising:
an image sensor according to claim 1;
an interpolation unit that interpolates image outputs at positions of the first pixels and the second pixels based upon outputs from the image-capturing pixels surrounding the first pixels and the second pixels; and
a control unit that generates an image signal based upon the image outputs obtained through interpolation executed by the interpolation unit at the positions of the first pixels and the second pixels, and the outputs from the image-capturing pixels.

16. An image sensor according to claim 1, wherein:
the first pixels in the first focus detection pixel areas and the second pixels in the second focus detection pixel areas each include a micro lens and a pair of photoelectric conversion units, and
a pair of regions on an exit pupil and the pair of photoelectric conversion units have a conjugate relationship to each other via the micro-lens.

17. An image sensor according to claim 1, wherein:
the image sensor is placed at the imaging plane of the optical system for capturing an image formed by the optical system and detecting a focus adjustment state of the optical system.

18. An image sensor that is to be placed at an imaging plane of an optical system and is equipped with imaging pixels disposed in a two-dimensional array, which converts an image formed through the optical system to an electrical signal, comprising:
- image-capturing pixels that are disposed in the array of the imaging pixels and are used for functions including displaying an image;
- first focus detection pixel areas each formed by disposing in the array of the imaging pixels a plurality of first pixels adopting a split pupil method that are used for focus detection; and
- second focus detection pixel areas each formed by disposing in the array of the imaging pixels a plurality of second pixels adopting a split pupil method different from the split pupil method adopted in the first pixels that are used for focus detection, wherein:
- a relationship between a number of the first focus detection pixel areas and a number of the second focus detection pixel areas is determined in correspondence to distances of positions of the first focus detection pixel areas and the second focus detection pixel areas from a center of the image sensor.

19. A method for manufacturing an image sensor that is to be placed at an imaging plane of an optical system and is equipped with imaging pixels disposed in a two-dimensional array, which converts an image formed through the optical system to an electrical signal, comprising:
- disposing image-capturing pixels in the array of the imaging pixels that are used for functions including displaying an image;
- forming first focus detection pixel areas each by disposing in the array of the imaging pixels a plurality of first pixels adopting a split pupil method that are used for focus detection; and
- forming second focus detection pixel areas each by disposing in the array of the imaging pixels a plurality of second pixels adopting a split pupil method different from the split pupil method adopted in the first pixels that are used for focus detection, wherein:
- a relationship between a number of the first focus detection pixel areas and a number of the second focus detection pixel areas is determined in correspondence to directions of positions of the first focus detection pixel areas and the second focus detection pixel areas relative to a center of the image sensor,
- wherein the method for manufacturing is performed through lithography technology.

20. A method for manufacturing an image sensor according to claim 19, wherein:
- when the image sensor is divided into a first region ranging along a first direction in which the first pixels in each of the first focus detection pixel areas are disposed and a second region ranging along a second direction in which the second pixels in each of the second focus detection pixel areas are disposed, the second focus detection pixel areas are disposed in a greater number than the first focus detection pixel areas in the first region and the first focus detection pixel areas are disposed in a greater number than the second focus detection pixel areas in the second region.

21. A method for manufacturing an image sensor according to claim 19, wherein:
- the relationship between the number of the first focus detection pixel areas and the number of the second focus detection pixel areas is determined in correspondence to a distance from the center of the image sensor.

22. A method for manufacturing an image sensor according to claim 19, wherein:
- the first pixels and the second pixels are disposed respectively along a first direction and a second direction in which pixels are disposed densely in the array of the imaging pixels; and
- when the image sensor is divided into a first region ranging along the first direction and a second region ranging along the second direction with borderlines extending along radial directions different from the first direction and the second direction in reference to a position through which an optical axis of the optical system passes, the second focus detection pixel areas are disposed in a greater number than the first focus detection pixel areas in the first region and the first focus detection pixel areas are disposed in a greater number than the second focus detection pixel areas in the second region.

23. A method for manufacturing an image sensor according to claim 19, wherein:
- photoelectric conversion units at the first pixels in the first focus detection pixel areas have a size different from the size of photoelectric conversion units at the second pixels in the second focus detection pixel areas.

24. A method for manufacturing an image sensor according to claim 20, wherein:
- photoelectric conversion units at the first pixels in the first focus detection pixel areas disposed in the first region are smaller in size than photoelectric conversion units at the second pixels in the second focus detection pixel areas disposed in the first region.

25. A method for manufacturing an image sensor according to claim 19, wherein:
- the first pixels each include a photoelectric conversion unit that receives a light flux having passed through at least one of a pair of areas set side by side along a first direction on an exit pupil of the optical system and the first focus detection pixel areas are each formed by disposing a plurality of the first pixels along a direction corresponding to the first direction;
- the second pixels each include a photoelectric conversion unit that receives a light flux having passed through at least one of a pair of areas set side by side along a second direction different from the first direction on the exit pupil of the optical system and the second focus detection pixel areas are each formed by disposing a plurality of the second pixels along a direction corresponding to the second direction; and
- when the image sensor is divided into a first region ranging along a direction corresponding to the first direction and a second region ranging along a direction corresponding to the second direction with borderlines extending along radial directions different from the first direction and the second direction in reference to a position through which an optical axis of the optical system passes, the second focus detection pixel areas are disposed in a greater number than the first focus detection pixel areas in the first region and the first focus detection pixel areas are disposed in a greater number than the second focus detection pixel areas in the second region.

26. A method for manufacturing an image sensor according to claim 22, wherein:
- a ratio of the number of the first focus detection pixel areas to the number of the second focus detection pixel areas is gradually reduced further away from the position at which the optical axis passes in the first region and a ratio of the number of the second focus detection pixel areas to the number of the first focus detection pixel areas is gradually reduced further away from the position at which the optical axis passes in the second region.

27. A method for manufacturing an image sensor that is to be placed at an imaging plane of an optical system and is equipped with imaging pixels disposed in a two-dimensional array, which converts an image formed through the optical system to an electrical signal, comprising:
- disposing image-capturing pixels in the array of the imaging pixels that are used for functions including displaying an image;
- forming first focus detection pixel areas each by disposing in the array of the imaging pixels a plurality of first pixels adopting a split pupil method that are used for focus detection; and
- forming second focus detection pixel areas each by disposing in the array of the imaging pixels a plurality of second pixels adopting a split pupil method different from the split pupil method adopted in the first pixels that are used for focus detection, wherein:
- a relationship between a number of the first focus detection pixel areas and a number of the second focus detection pixel areas is determined in correspondence to distances of positions of the first focus detection pixel areas and the second focus detection pixel areas from a center of the image sensor,
- wherein the method for manufacturing is performed through lithography technology.

* * * * *